United States Patent
Miyoshi

(10) Patent No.: US 10,097,827 B2
(45) Date of Patent: Oct. 9, 2018

(54) APPARATUS AND METHOD FOR IMAGE ENCODING, APPARATUS AND METHOD FOR IMAGE DECODING, AND IMAGE TRANSMISSION SYSTEM

(71) Applicant: FUJITSU LIMITED, Kawasaki-shi, Kanagawa (JP)

(72) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 15/461,975

(22) Filed: Mar. 17, 2017

(65) Prior Publication Data

US 2017/0289541 A1  Oct. 5, 2017

(30) Foreign Application Priority Data

Apr. 5, 2016  (JP) ................. 2016-075656

(51) Int. Cl.
| | |
|---|---|
| *H04N 19/117* | (2014.01) |
| *H04N 19/463* | (2014.01) |
| *H04N 19/14* | (2014.01) |
| *H04N 19/186* | (2014.01) |

(52) U.S. Cl.
CPC .......... *H04N 19/117* (2014.11); *H04N 19/14* (2014.11); *H04N 19/186* (2014.11); *H04N 19/463* (2014.11)

(58) Field of Classification Search
CPC ... H04N 19/103; H04N 19/176; H04N 19/182
See application file for complete search history.

(56) References Cited

U.S. PATENT DOCUMENTS

| | | | |
|---|---|---|---|
| 9,392,277 B2* | 7/2016 | Kondow | ................. H04N 19/13 |
| 9,497,455 B2* | 11/2016 | Yamazaki | .............. H04N 19/70 |
| 2012/0281749 A1 | 11/2012 | Ikai | |
| 2014/0092958 A1 | 4/2014 | Sato | |
| 2015/0023420 A1* | 1/2015 | Minezawa | ....... H04N 19/00951 |
| | | | 375/240.13 |
| 2015/0195523 A1* | 7/2015 | Sato | ....................... H04N 19/70 |
| | | | 375/240.12 |
| 2016/0050421 A1 | 2/2016 | Minezawa et al. | |

FOREIGN PATENT DOCUMENTS

| | | |
|---|---|---|
| JP | 2013-012845 | 1/2013 |
| JP | 2013-236358 | 11/2013 |
| WO | 2011-083666 | 7/2011 |
| WO | 2012-121352 | 9/2012 |
| WO | 2014-163200 | 10/2014 |

* cited by examiner

*Primary Examiner* — Tsion B Owens
(74) *Attorney, Agent, or Firm* — Fujitsu Patent Center

(57) ABSTRACT

An image encoding apparatus includes a mode determining unit and an encoding unit. The mode determining unit determines a first operating mode and a second operating mode of an adaptive filter which is applied to a block in an input image in decoding. In this regard, the mode determining unit determines the first operating mode based on a first signal of the input image, and determines the second operating mode based on a second signal of the input image. The encoding unit encodes the second operating mode by assigning a code with a lower bit number to the second operating mode when the second operating mode has higher similarities to the first operating mode.

15 Claims, 20 Drawing Sheets

130 STORAGE UNIT

131a ASSIGNMENT TABLE
(FOR LUMINANCE SIGNAL)

| SAO TYPE | sao_type_idx_luma |
|---|---|
| NONE | 0 |
| BO | 1 |
| EO | 2 |

131b ASSIGNMENT TABLE
(FOR LUMINANCE SIGNAL)

| EO CLASS | sao_eo_class_luma |
|---|---|
| 0 ( EDGE 0° ) | 0 |
| 1 ( EDGE 90° ) | 1 |
| 2 ( EDGE 135° ) | 2 |
| 3 ( EDGE 45° ) | 3 |

FIG. 4

APPARATUS AND METHOD FOR IMAGE ENCODING, APPARATUS AND METHOD FOR IMAGE DECODING, AND IMAGE TRANSMISSION SYSTEM

CROSS-REFERENCE TO RELATED APPLICATION

This application is based upon and claims the benefit of priority of the prior Japanese Patent Application No. 2016-075656, filed on Apr. 5, 2016, the entire contents of which are incorporated herein by reference.

FIELD

The embodiments discussed herein are related to an image encoding apparatus, image encoding method, image decoding apparatus, image decoding method, and image transmission system.

BACKGROUND

H.265/HEVC (High Efficiency Video Coding), hereinafter for brevity "HEVC", has attracted much attention as the next-generation video coding standard. Compared to existing H.264/MPEG-4 AVC (Moving Picture Experts Group-phase 4 Advanced Video Coding) standard, HEVC provides almost double the compression performance. In HEVC, an adaptive filter called SAO (sample adaptive offset) is applied to improve the quality of decoded images.

As for technology related to adaptive filters, there is provided, for example, an image processing apparatus for calculating an offset value for color difference signals with respect to each divided region by referring to a quadtree structure and an offset value determined for a luminance signal supplied from an adaptive offset unit.

As for decoding techniques in HEVC, there is provided, for example, an image decoding apparatus for generating a predicted image of color difference signals either by making a directional prediction of the color difference signals or based on a correlation parameter indicating the correlation between a luminance signal and the color difference signals according to an intra prediction parameter of the color difference signals.

See, for example, Japanese Laid-open Patent Publication No. 2013-12845 and International Publication Pamphlet No. WO 2014163200

There are a plurality of setting items for the adaptive filters above, and in an encoding process, setting values for the individual items are encoded and set in encoded data. Thus, for encoded video data, information of the encoded setting values for a large number of items is configured. This contributes to an increase in the amount of encoded data.

SUMMARY

According to an aspect, there is provided an image encoding apparatus including a processor configured to perform the following procedure. The procedure includes determining a first operating mode and a second operating mode of an adaptive filter that is applied to a block in an input image in decoding. The determining includes a process of determining the first operating mode based on a first signal of the input image and a process of determining the second operating mode based on a second signal of the input image. The procedure also includes encoding the second operating mode by assigning a code with a lower bit number to the second operating mode when the second operating mode has higher similarities to the first operating mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates assignment tables used to assign indexes to filtering modes of a luminance signal;

DESCRIPTION OF EMBODIMENTS

Figure 1:
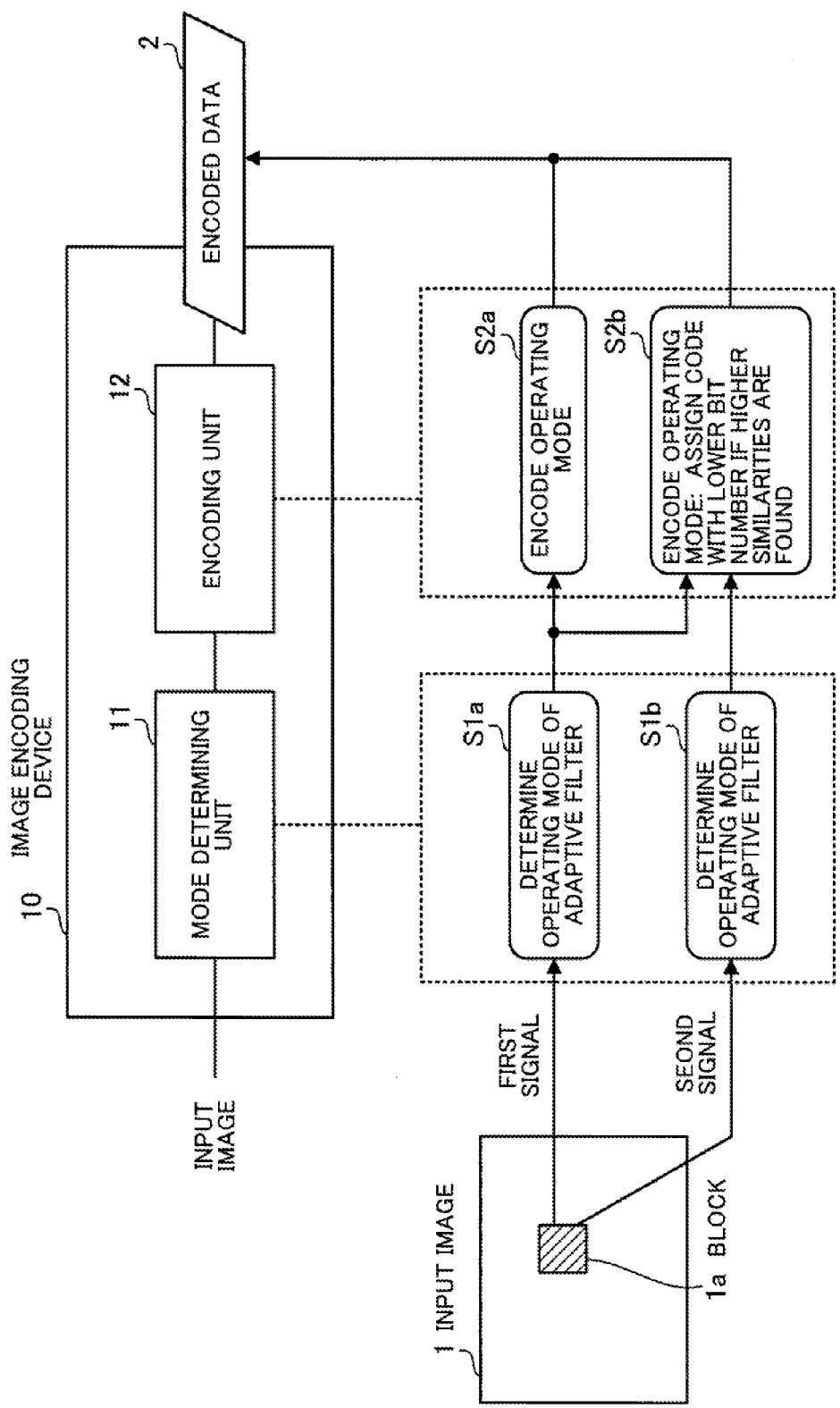
FIG. 1 illustrates a configuration and processing example of an image encoding device according to a first embodiment.

Several embodiments will be described below with reference to the accompanying drawings, wherein like reference numerals refer to like elements throughout.

(a) First Embodiment

FIG. 1 illustrates a configuration and processing example of an image encoding device according to a first embodiment. An image encoding device 10 is a device for generating encoded data by encoding an input image, which is a video. Let us assume the case where an input image 1 is input and encoded data 2 is then output. The image encoding device 10 includes a mode determining unit 11 and an encoding unit 12. The mode determining unit 11 and the encoding unit 12 are implemented, for example, as semiconductor circuits. At least part of processes of the mode determining unit 11 and the encoding unit 12 may be implemented by a processor executing a predetermined program.

The mode determining unit 11 determines a first operating mode and a second operating mode of an adaptive filter which is applied to an encoding target block 1a in the input image 1 in decoding. The mode determining unit 11 determines the first operating mode based on a first signal of the input image 1 (step S1a), and then determines the second operating mode based on a second signal of the input image 1 (step S1b). Note that the first signal is a luminance signal and the second signal is color difference signals, for example. Alternatively, the first signal may be a green signal (G), and the second signal may be a signal based on a red signal (R) and a blue signal (B).

The encoding unit 12 encodes the first operating mode and the second operating mode in order to incorporate information indicating the first operating mode and the second operating mode into the encoded data 2 (steps S2a and S2b). In encoding the second operating mode, the encoding unit 12 assigns a code with a lower bit number to the second operating mode when the second operating mode has higher similarities to the first operating mode.

The first and second signals are correlated to each other because of being signal components of the same input image 1. For this reason, the second operating mode is likely to resemble the first operating mode. For example, the second operating mode coinciding with the first operating mode is more likely to take place than the second operation mode not matching the first operating mode. Therefore, when each block in the input image 1 undergoes the above-described process, a code with a low bit number is likely to be assigned to the second operating mode for the block.

Assume for example that a code of one bit is assigned to the second operating mode if the second operating mode is the same as the first operating mode, and a code of two bits is assigned to the second operating mode if the second operating mode is different from the first operating mode. In this case, because the second operating mode is likely to be the same as the first operating mode as mentioned above, the second operating mode for each block is more likely to be assigned a one-bit code than a two-bit code. This increases the probability that one-bit codes associated with the second operating mode for the individual blocks are incorporated into the encoded data 2. As a result, it is possible to reduce the amount of the encoded data 2.

Note that an image decoding device (not illustrated) is able to perform the following decoding process after receiving the encoded data 2 generated in the procedure above.

The image decoding device acquires, from the received encoded data 2, a first code and a second code indicating the first operating mode and the second operating mode, respectively, for the block 1a. The image decoding device identifies the first operating mode based on the first code. Then, the image decoding device identifies the second operating mode based on the identified first operating mode and the second code. In this regard, the image decoding device identifies the second operating mode as an operating mode having more similarities to the identified first operating mode if the bit number of the second code is lower. By applying the first and second operating modes identified in this manner, the image decoding device performs adaptive filtering on the block 1a in a decoded image. Herewith, for example, the quality of the decoded image corresponding to the input image 1 is improved.

(b) Second Embodiment

Figure 2:
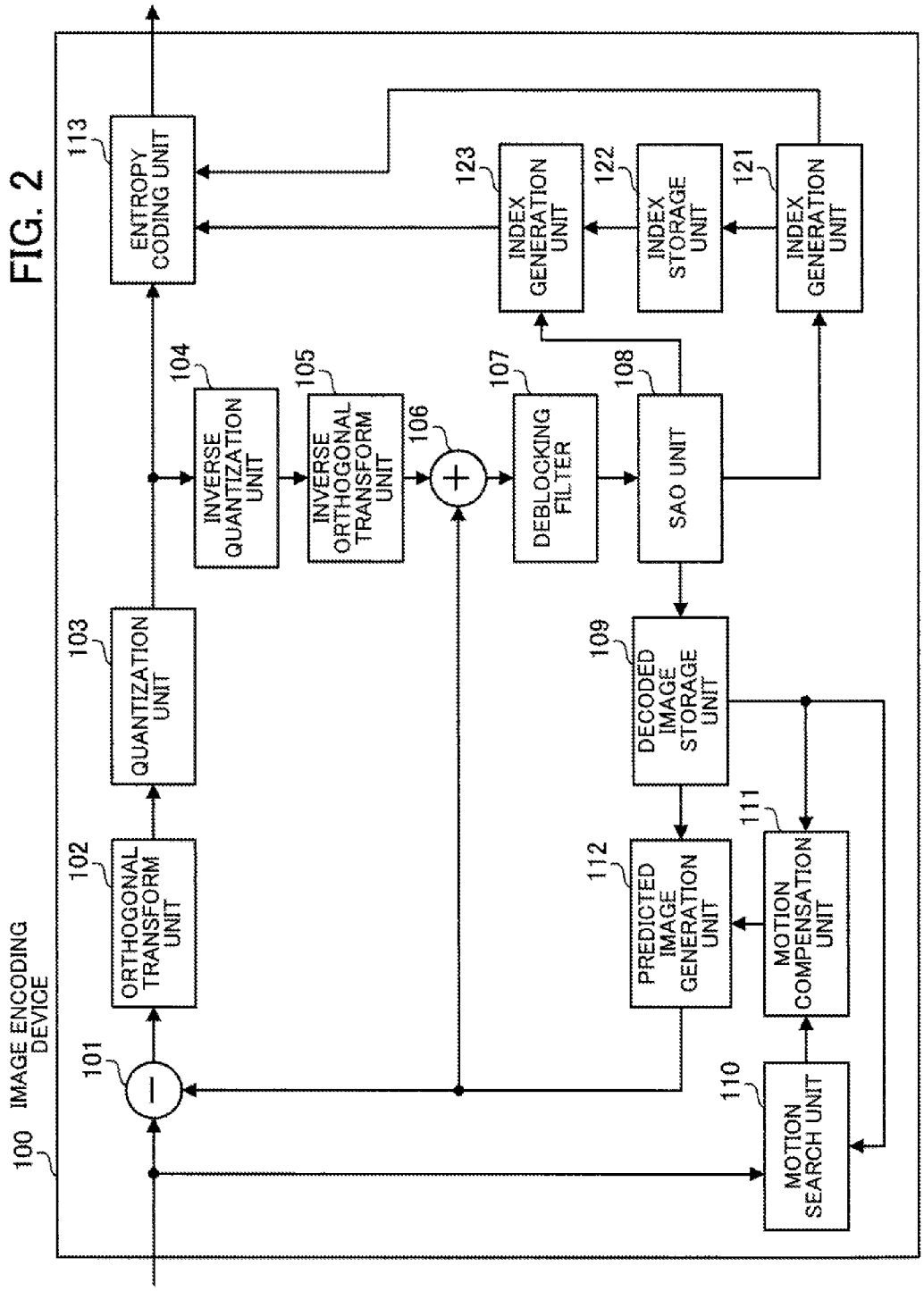
FIG. 2 illustrates a configuration example of an image encoding device according to a second embodiment.

Next, a second embodiment is directed to an image encoding device and image decoding device performing encoding and decoding, respectively, of a video in HEVC. FIG. 2 illustrates a configuration example of an image encoding device according to the second embodiment. An image encoding device 100 includes a prediction error signal generation unit 101, an orthogonal transform unit 102, a quantization unit 103, an inverse quantization unit 104, an inverse orthogonal transform unit 105, a decoded image generation unit 106, a deblocking filter 107, an SAO unit 108, a decoded image storage unit 109, a motion search unit 110, a motion compensation unit 111, a predicted image generation unit 112, and an entropy coding unit 113.

Each picture of video data input into the image encoding device 100 is divided into blocks. The prediction error signal generation unit 101 acquires an encoding target block and calculates the difference between the acquired encoding target block and a predicted image output from the predicted image generation unit 112 to thereby generate a prediction error signal. The orthogonal transform unit 102 applies an orthogonal transform to the prediction error signal output from the prediction error signal generation unit 101 and outputs signals of separated horizontal and vertical frequency components. The quantization unit 103 quantizes the signals output from the orthogonal transform unit 102. This reduces the amount of information on the prediction error signal.

The inverse quantization unit 104 applies inverse-quantization to the quantized data output from the quantization unit 103. The inverse orthogonal transform unit 105 applies an inverse-orthogonal transform to the data output from the inverse quantization unit 104. Herewith, a signal corresponding to the prediction error signal before being encoded is obtained. The decoded image generation unit 106 adds block data of the predicted image output from the predicted image generation unit 112 and the signal output from the inverse orthogonal transform unit 105. Herewith, block data of a locally decoded image is generated, in which the encoding target block has been reproduced. The deblocking filter 107 applies a filtering process for reducing block distortion to the block data of the locally decoded image output from the decoded image generation unit 106. For the block data of the locally decoded image processed by the deblocking filter 107, the SAO unit 108 applies a process of adding an offset to each pixel value by a predetermined method.

The decoded image storage unit 109 stores the block data of the locally decoded image processed by the SAO unit 108 as block data of a new reference picture. Using a block matching technique, the motion search unit 110 identifies, within the reference picture stored in the decoded image storage unit 109, a region bearing resemblance to the encoding target block, and calculates a motion vector indicating the location of the identified region. The motion compensation unit 111 generates a predicted image using inter prediction by performing motion compensation on the reference picture read from the decoded image storage unit 109 using the motion vector calculated by the motion search unit 110. The predicted image generation unit 112 outputs a predicted image obtained by intra or inter prediction. The predicted image obtained by intra prediction is generated based on data of encoded neighboring blocks in the reference picture stored in the decoded image storage unit 109. The predicted image obtained by inter prediction is acquired from the motion compensation unit 111. The entropy coding unit 113 entropy codes the quantized data output from the quantization unit 103 and then outputs it as a video stream. The entropy coding is a coding scheme that assigns a variable-length code to a symbol according to its frequency of occurrence.

In addition, the image encoding device 100 also includes an index generation unit 121, an index storage unit 122, and an index generation unit 123 as functions for calculating indexes for SAO filtering modes. The index generation unit 121 receives an entry of a filtering mode associated with a luminance signal determined by the SAO unit 108, and generates an index for the filtering mode of the luminance signal. The index storage unit 122 temporarily stores the index of the filtering mode of the luminance signal generated by the index generation unit 121. The index generation unit 123 generates an index for a filtering mode associated with color difference signals based on the index of the filtering mode of the luminance signal stored in the index storage unit 122 and the filtering mode of the color difference signals determined by the SAO unit 108. The entropy coding unit 113 acquires the indexes of the filtering modes from the individual index generation units 121 and 123 as entropy-coding target syntax elements, and then entropy codes the acquired indexes.

YUV is known as an image format used in video coding, which separates a luminance signal (Y component) from color difference signals (U and V components). Note that Cb and Cr components may be used as the color difference signals instead. In addition, reducing the resolution of the color difference signals is known as a method of reducing the amount of data of image signals in YUV. Specifically, a color format that preserves full-resolution color difference signals (that is, the color difference signals are represented at the same resolution as the luminance signal) is called "4:4:4" format. In addition, a color format that samples the color difference signals at half the horizontal resolution of the luminance signal is called "4:2:2" format. Further, a color format in which both the horizontal and vertical resolutions of the color difference signals are halved is called "4:2:0" format. The image encoding device 100 of this embodiment supports encoding of image signals in any of the above formats.

In the "4:4:4" format, RGB components may be used in place of the YUV components. In this case, as defined in Annex E of HEVC, signal transmission is performed with the G, B, and R components regarded as the Y, U, and V components, respectively. This enables image encoding of RGB components to be implemented as is the case with YUV components. The image encoding device 100 of this embodiment supports encoding of such image components.

Figure 3:
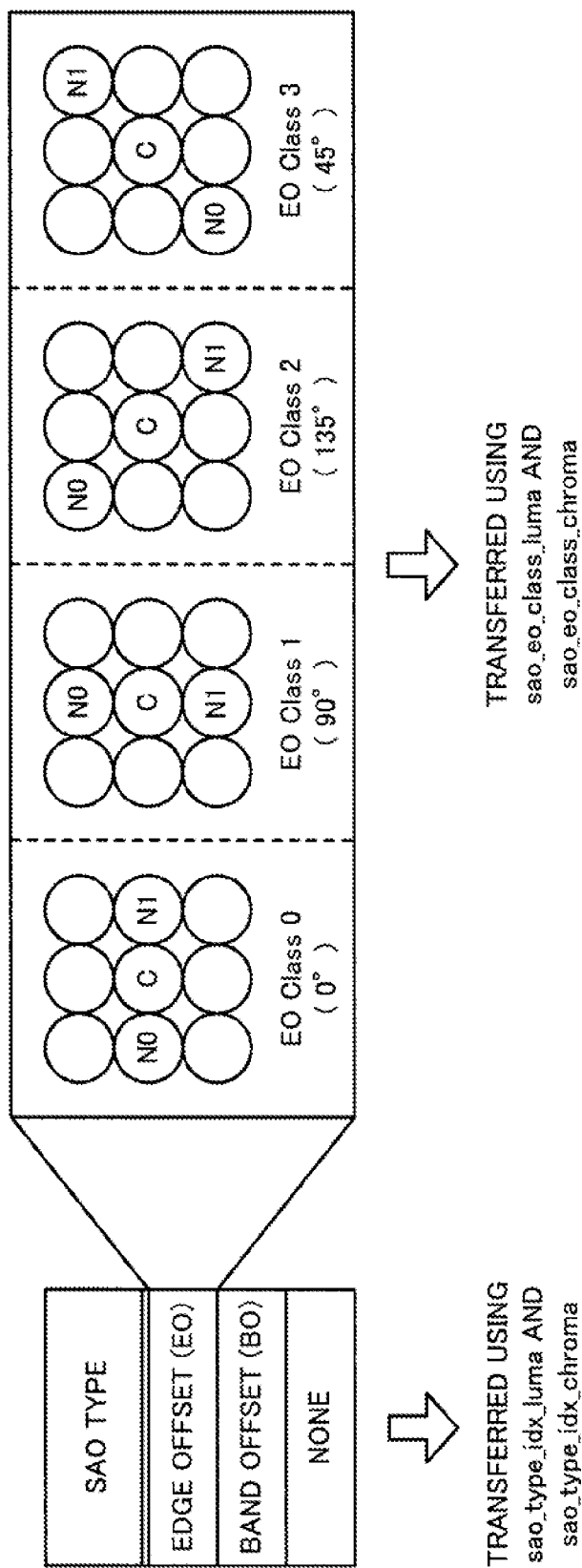
FIG. 3 is a diagram illustrating SAO.

FIG. 3 is a diagram illustrating SAO. SAO is a loop filtering technique newly adopted in HEVC. SAO is helpful to reduce ringing artifacts caused by a motion compensated filter and correct deviations in pixel values sometimes found on a decoded image to thereby improve image quality. In SAO filtering, an offset is added to each pixel value according to a predetermined method. In addition, SAO parameters (filtering modes) are set for each coding tree unit (CTU).

As illustrated in FIG. 3, SAO supports filtering types (SAO types) called "edge offset (EO)", "band offset (BO)", and "none" which provides no filtering. For each CTU, a SAO type may be designated separately for the luminance signal and the color difference signals. The SAO type for the luminance signal is defined by a syntax element named sao_type_idx_luma while the SAO type for the color difference signals is defined by a syntax element named sao_type_idx_chroma, and then the SAO types are transmitted from an encoding side to a decoding side. In the edge offset process, an offset is added to each pixel value based on the relationship of a current pixel C and two neighboring pixels N0 and N1. On the other hand, in the band offset process, the range of pixel intensity is divided into 32 bands and pixel values belonging to four consecutive bands within the 32 bands are modified by adding an offset determined for each band.

When the SAO type is edge offset, one of four classes (hereinafter referred to as the "edge offset (EO) classes") is selected according to the locations of the neighboring pixels N0 and N1. As illustrated in FIG. 3, different edge offset classes have different directional patterns of the neighboring pixels, namely, different edge angles. EO Class 0 indicates an edge angle of 0 degrees; EO Class 1 indicates an edge angle of 90 degrees; EO Class 2 indicates an edge angle of 135 degrees; and EO Class 3 indicates an edge angle of 45 degrees. For each CTU, an edge offset class may be designated separately for the luminance signal and the color difference signals. The edge offset class for the luminance signal is defined by a syntax element named sao_eo_class_luma while the edge offset class for the color difference signals is defined by a syntax element named sao_eo_class_chroma, and then the edge offset classes are transmitted from the encoding side to the decoding side.

Further, for each of the selected edge offset classes, the absolute value of an offset is obtained with respect to each of four categories that are determined according to the relative relationship based on the pixel values of the pixel C and the neighboring pixels N0 and N1. Now let us describe an example of the edge offset class selection process. Based on the relationship among the pixel C and the neighboring pixels N0 and N1, the following four categories are defined:
Category 1: C<N0 and C<N1;
Category 2: C<N0 and C=N1, or C=N0 and C<N1;
Category 3: C>N0 and C=N1, or C=N0 and C>N1; and
Category 4: C>N0 and C>N1.

The key idea of SAO is to reduce coding errors by first determining, among these categories, one with the largest errors and then adding an offset to each pixel to minimize the largest errors. In view of this, the image encoding device 100 calculates a cumulative error of each category with respect to the individual edge offset classes. When a pixel of an input image (original image) is denoted by $O(x, y)$ and a pixel of a decoded image output from the deblocking filter 107 is denoted by $R(x, Y)$, an error E is calculated as: $E=O(x, y)-R(x, y)$ in the case of EO Class 0 (i.e., edge angle=0 degrees). When the pixel C is classified into a category n, a cumulative error value $E(n)$ of the category n is calculated as: $E(n)=\Sigma\{O(x, y)-R(x, y)\}$. In addition, a maximum error absolute value |E(n)| amongst the cumulative error values E(n) of the individual categories n for EO Class 0 is denoted by E(Class 0). In like fashion, the maximum error absolute values E(Class 1), E(Class 2), and E(Class 3) are calculated for EO Class 1, EO Class 2, and EO Class 3, respectively. The image encoding device 100 determines, amongst these edge offset classes, one with the largest maximum error absolute value as an edge offset class to be applied in decoding.

On the other hand, the maximum error absolute value is able to be calculated also for the band offset process. The image encoding device 100 eventually determines SAO setting values by selecting, between the edge offset process and the band offset process, one with the larger maximum error absolute value. In the above-described manner, at least an SAO type is determined, as well as an edge offset class when the SAO type is edge offset. Note that, amongst syntax elements associated with SAO, the above-mentioned sao_type_idx_luma, sao_type_idx_chroma, sao_eo_class_luma, and sao_eo_class_chroma are sometimes referred to as "filtering modes".

FIG. 4 illustrates assignment tables used to assign indexes to filtering modes of the luminance signal. Assignment tables 131*a* and 131*b* of FIG. 4 are, for example, preliminarily stored in a storage unit 130 of the image encoding device 100 and referenced by the index generation unit 121. Note that the storage unit 130 is implemented as a storage area of a non-volatile storage medium, such as flash memory and electrically erasable programmable read only memory (EEPROM). Once the SAO type of the luminance signal is determined by the SAO unit 108, the index generation unit 121 assigns an index (a syntax element value) to the filtering mode indicating the SAO type (sao_type_idx_luma) based on the assignment table 131*a*. In addition, when the SAO unit 108 has determined the SAO type of the luminance signal as edge offset (EO) and then its edge offset class, the index generation unit 121 assigns an index to the filtering mode indicating the edge offset class (sao_eo_class_luma) based on the assignment table 131*b*. Note that when an index takes a lower value, a lower bit number is assigned in entropy coding.

In conventional techniques, indexes are assigned to the filtering modes of the color difference signals based on correspondence relationships similar to those illustrated in FIG. 4. On the other hand, according to this embodiment, the index generation unit 123 assigns a lower index value to a setting value likely to be determined for the color difference signals amongst setting values of each filtering mode of the color difference signals based on a correlation between the luminance signal and the color difference signals. Herewith, codes with low bit numbers are likely to be assigned to the filtering modes in entropy coding, thereby reducing the amount of video stream data.

Figure 5:
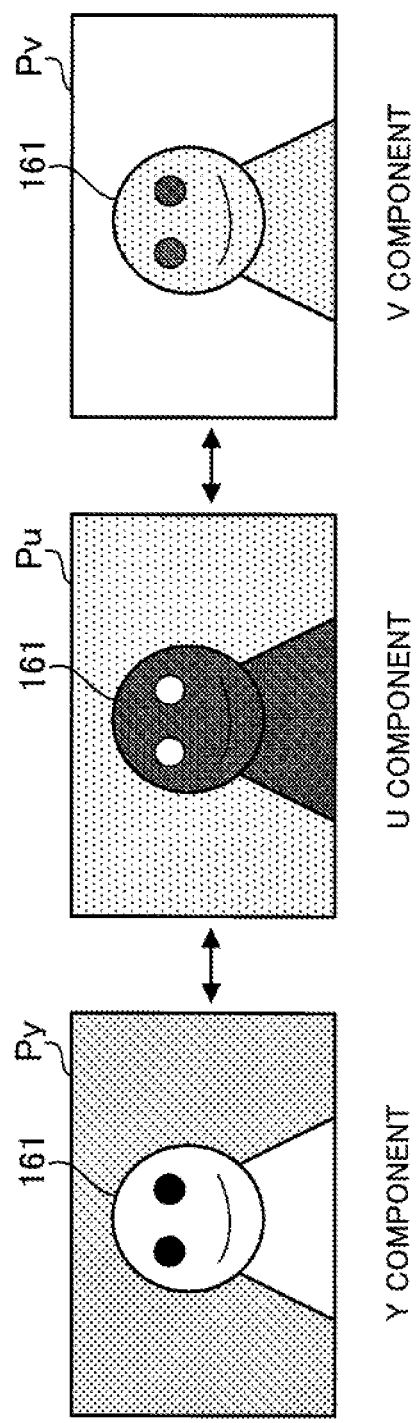
FIG. 5 is a diagram illustrating a correlation between the luminance signal and color difference signals.

FIG. 5 is a diagram illustrating a correlation between the luminance signal and the color difference signals. FIG. 5 illustrates an example with an image Py based on the Y component, an image Pu based on the U component, and an image Pv based on the V component, which are formed by dividing an image with a person 161. The Y, U, and V components do not have a correlation in their pixel values but have a correlation in the presence and absence of edges and edge directions. For example, when an edge is found in an image based on the luminance signal, there is likely to be a change in color at the edge. In the example of FIG. 5, as for an edge region formed between the person 161 and the background in the image Py based on the Y component, corresponding edges are likely to be found in the individual images Pu and Pv based on the U and V components, respectively. In addition, a lower decimation rate of the color difference signals results in a higher correlation with the luminance signal because it facilitates maintaining higher definitions of edges. Therefore, the correlation between the luminance signal and the color difference signals is higher in the following order: 4:4:4 format>4:2:2 format>4:2:0 format.

Figure 6:
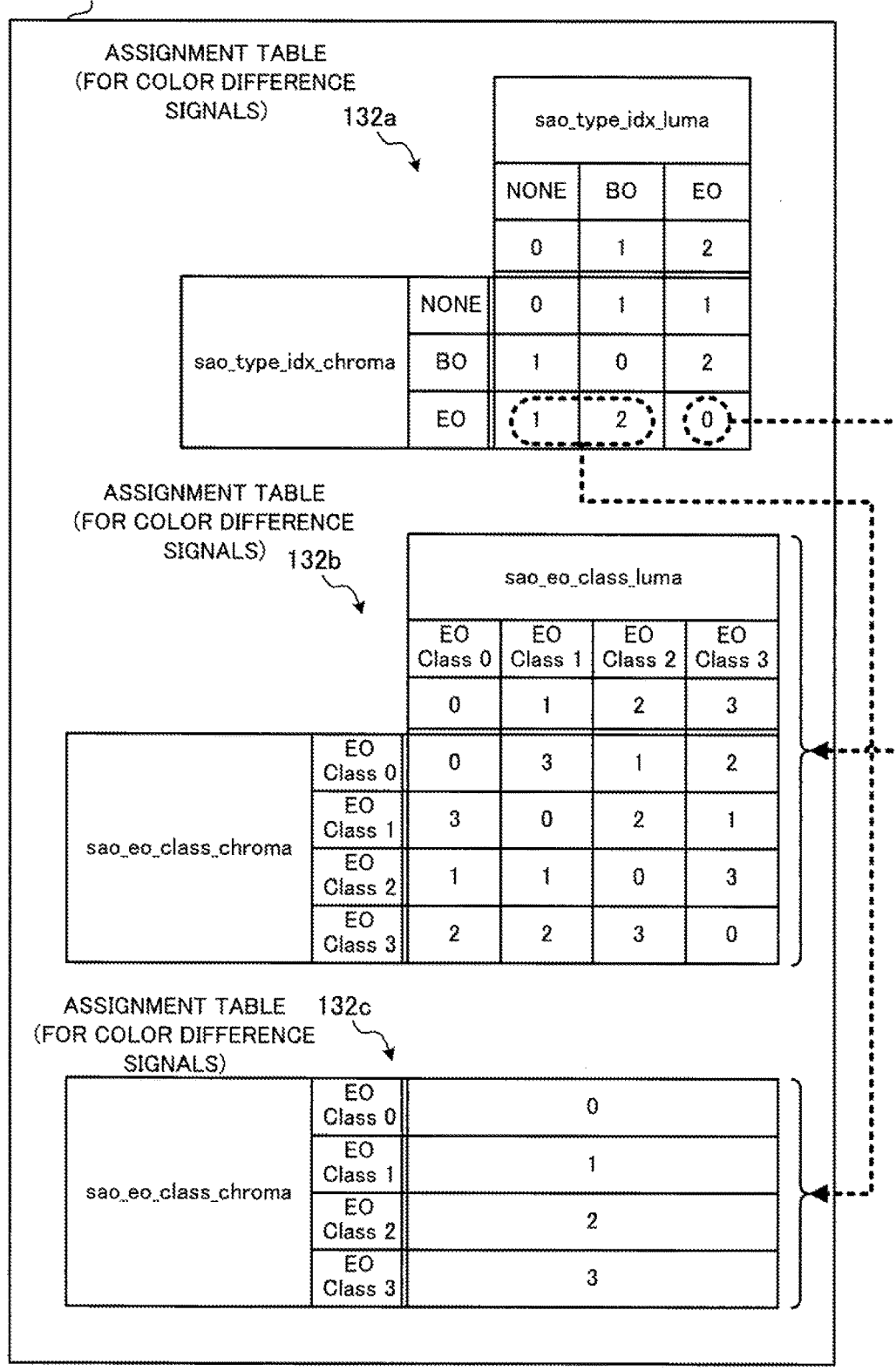
FIG. 6 illustrates an example of assignment tables used to assign indexes to filtering modes of the color difference signals.

Thus, the Y, U, and V components have a correlation in the presence and absence of edges and edge directions. Therefore, the setting value of each filtering mode of the color difference signals is likely to be the same as that of the corresponding filtering mode of the luminance signal. In view of this, the index generation unit 123 assigns a lower index to a setting value determined by the SAO unit 108 for each filtering mode of the color difference signals when the setting value bears more resemblance to the setting value of the corresponding filtering mode of the luminance signal. Specifically, the index generation unit 123 assigns an index based on conversion tables illustrated in FIG. 6. FIG. 6 illustrates an example of assignment tables used to assign indexes to filtering modes of color difference signals. Assignment tables 132*a*, 132*b*, and 132*c* of FIG. 6 are, for example, preliminarily stored in the storage unit 130 above and referenced by the index generation unit 123.

The assignment table 132*a* is used to assign an index to the filtering mode indicating the SAO type of the color difference signals (sao_type_idx_chroma). In the assignment table 132*a*, indexes are individually associated with a combination of one of indexes determined for the SAO types of the luminance signal and one of the SAO types defined for the color difference signals. Therefore, once a SAO type of the color difference signals is determined by the SAO unit 108, the index generation unit 123 acquires the SAO type of the color difference signals from the SAO unit 108, and also acquires an index corresponding to the SAO type of the luminance signal for the same block from the index storage unit 122. Then, based on the acquired information and the assignment table 132*a*, the index generation unit 123 assigns an index to sao_type_idx_chroma.

As mentioned above, the luminance and color difference signals have a correlation in the presence and absence of edges and edge directions. Therefore, according to the assignment table 132*a*, an index of the minimum value is assigned to each SAO type of the color difference signals when the SAO type of the color difference signals is the same as that of the luminance signal. In addition, it is less likely that different types of filtering processes are selected for the luminance signal and the color difference signals (that is, the SAO type of one of the luminance signal and the color difference signals is edge offset and the SAO type of the other is band offset). This is because it is less likely that, for the same single region, an edge is found in one of the luminance signal and the color difference signals while a flat surface with no edge is observed in the other. For this reason, according to the assignment table 132*a*, an index of the maximum value is assigned to each SAO type of the color difference signals when the SAO type of one of the luminance signal and the color difference signals is edge offset and the SAO type of the other is band offset.

Note that "none" is selected, for example, when a property such as the presence of an edge or the surface being flat is not detected in the block. The resemblance between none and edge offset, or band offset, is considered to be higher than the resemblance between edge offset and band offset whose properties are dissimilar to each other. Therefore, according to the assignment table 132*a*, an index of an intermediate value is assigned to each SAO type of the color difference signals when the SAO type of one of the luminance signal and the color difference signals is none and the SAO type of the other is edge offset or band offset.

The assignment tables 132b and 132c are used to assign an index to the filtering mode indicating the edge offset class of the color difference signals (sao_eo_class_chroma). First, in the case where edge offset is selected as the SAO type for both the luminance and color difference signals, an index is assigned to sao_eo_class_chroma using the assignment table 132b. In the assignment table 132b, indexes are individually associated with a combination of one of indexes determined for the edge offset classes of the luminance signal and one of the edge offset classes defined for the color difference signals. Therefore, once an edge offset class of the color difference signals is determined by the SAO unit 108, the index generation unit 123 acquires the edge offset class of the color difference signals from the SAO unit 108, and also acquires an index corresponding to the edge offset class of the luminance signal for the same block from the index storage unit 122. Then, based on the acquired information and the assignment table 132b, the index generation unit 123 assigns an index to sao_eo_class_chroma.

In the case where, in a given region, an edge is present in the luminance signal, an edge with the same angle is likely to be found also in the color difference signals. Therefore, according to the assignment table 132b, an index of the minimum value is assigned to each edge offset class of the color difference signals when the edge offset class of the color difference signals is the same as that of the luminance signal (that is, when the edge in the color difference signals has the same angle as the edge in the luminance signal). On the other hand, it is less likely that, between the color difference signals and the luminance signal, their selected edge offsets classes have greatly different edge angles (i.e., 90 degrees or so difference). The larger the difference between the two edge angles, the less resemblance the edge offset classes bear. Therefore, according to the assignment table 132b, when the edge offset classes individually selected for the luminance signal and the color difference signals have a larger difference in their edge angles, an index with a larger value is assigned to the edge offset class of the color difference signals. For example, when the edge offset classes individually selected for the luminance signal and the color difference signals consist of EO Classes 0 and 1 or EO Classes 2 and 3, an index of the maximum value is assigned to the corresponding edge offset class of the color difference signals.

The use of the assignment tables 132a and 132b enables assignment of indexes of lower values to setting values of each filtering mode of the color difference signals, having higher probabilities of occurrence. On the other hand, in the case where edge offset is selected as the SAO type of the color difference signals and a SAO type other than edge offset is selected for the luminance signal, an index is assigned to sao_eo_class_chroma using the assignment table 132c. In the assignment table 132c, indexes are individually associated with each edge offset class determined by the SAO unit 108 for the color difference signals, as is the case with the assignment table 131b (see FIG. 4) for the luminance signal. Therefore, when edge offset is selected as the SAO type of the color difference signals and a different SAO type is selected for the luminance signal, the index generation unit 123 assigns an index to sao_eo_class_chroma according to the assignment table 132c based solely on an edge offset class determined by the SAO unit 108 for the color difference signals.

Figure 7:
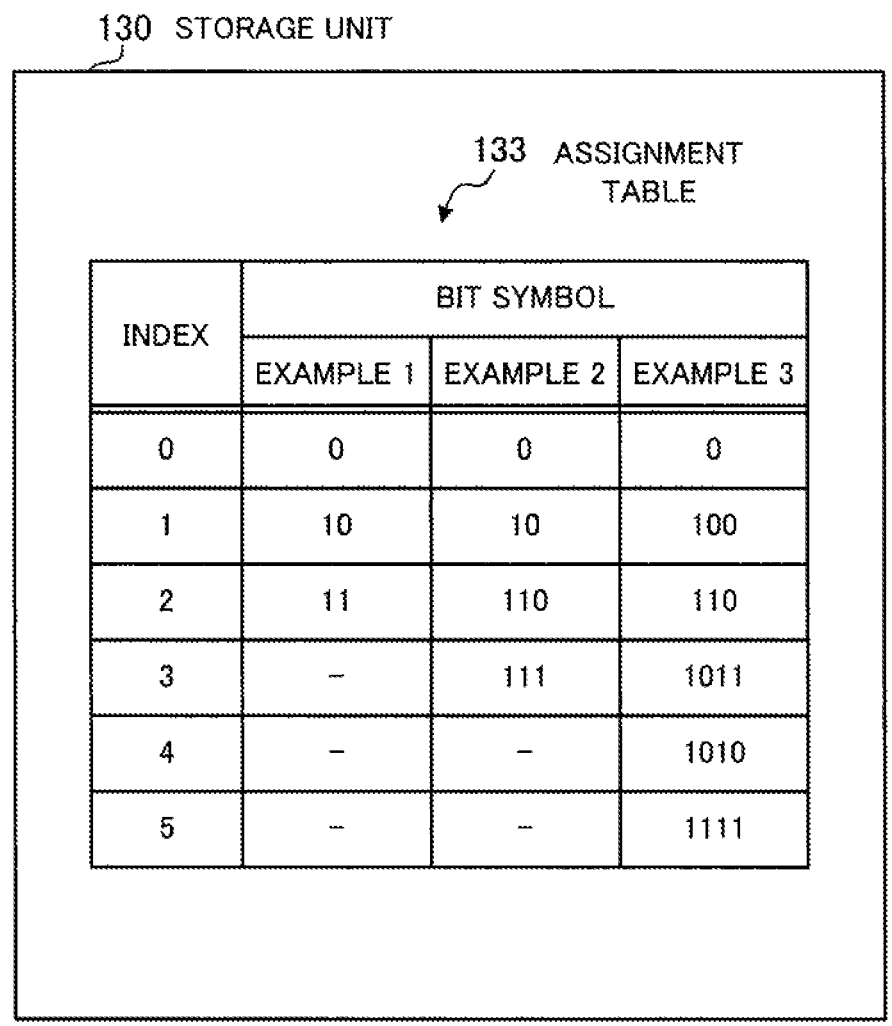
FIG. 7 illustrates an example of a bit symbol assignment table used in entropy coding.

FIG. 7 illustrates an example of bit symbol assignment table used in entropy coding. An assignment table 133 of FIG. 7 is, for example, preliminarily stored in the storage unit 130 above and referenced by the entropy coding unit 113. Based on the assignment table 133, the entropy coding unit 113 assigns bit symbols (codes) to the indexes assigned by the index generation unit 121 to the filtering modes of the luminance signal (sao_type_idx_luma and sao_eo_class_luma). In addition, the entropy coding unit 113 assigns, based on the assignment table 133, bit symbols (codes) to the indexes assigned by the index generation unit 123 to the filtering modes of the color difference signals (sao_type_idx_chroma and sao_eo_class_chroma).

As illustrated in FIG. 7, according to the assignment table 133, lower bit symbols are assigned to indexes of lower values. As described in FIGS. 5 and 6, as for the filtering modes of the color difference signals, indexes of lower values are assigned to their setting values with higher probabilities of occurrence based on a correlation with the luminance signal. Therefore, in entropy coding, bit symbols with lower bit numbers are assigned to the setting values of the filtering modes of the color difference signals, having higher probabilities of occurrence. As a result, the size of encoded data is reduced.

Note that FIG. 7 illustrates a plurality of examples of bit symbols to be assigned to indexes according to the number of possible setting-value patterns for a syntax element. Each of sao_type_idx_luma and sao_type_idx_chroma has three possible setting-value patterns, and bit symbols are, therefore, assigned to the indexes of the syntax element based on Example 1. Each of sao_eo_class_luma and sao_eo_class_chroma has four possible setting-value patterns, and bit symbols are, therefore, assigned to the indexes of the syntax element based on Example 2.

An additional explanation is given next of the case of using the individual R, G, and B components in 4:4:4 format. As mentioned above, in 4:4:4 format, signal transmission may be performed while regarding the G, B, and R components as the Y, U, and V components, respectively. The R, G, and B components are individually converted from the Y, U, and V components, for example, according to the following equations (1-1), (1-2), and (1-3), respectively. Note that these equations (1-1), (1-2), and (1-3) are defined by ITU-R (International Telecommunication Union, Radiocommunications Sector) BT.709.

$$R = 1.000*Y + 0.000*U + 1.402*V \tag{1-1}$$

$$G = 1.000*Y - 0.344*U + 0.714*V \tag{1-2}$$

$$B = 1.000*Y + 1.772*U + 0.000*V \tag{1-3}$$

As seen by equations (1-1) to (1-3), each of the R, G, and B components is calculated from the luminance and color difference signals. In addition, in 4:4:4 format, subsampling is done neither in the horizontal nor in the vertical direction, and a strong correlation among the signal components is therefore found. For this reason, in the case of using the individual R, G, and B components in 4:4:4 format also, the R, G, and B components have a strong correlation in the presence and absence of edges and edge directions. Therefore, in such a case also, assignment of indexes to filtering modes based on the B and R components by using the assignment tables 132a and 132b of FIG. 6 results in a reduction in the size of encoded data. The following description is directed to processes performed in the case of using the individual Y, U, and V components; however, even in the case of using the individual R, G, and B components in 4:4:4 format, the encoding and decoding processes are executable by the same procedures, achieving the same effect of reducing the size of encoded data.

Figure 8:
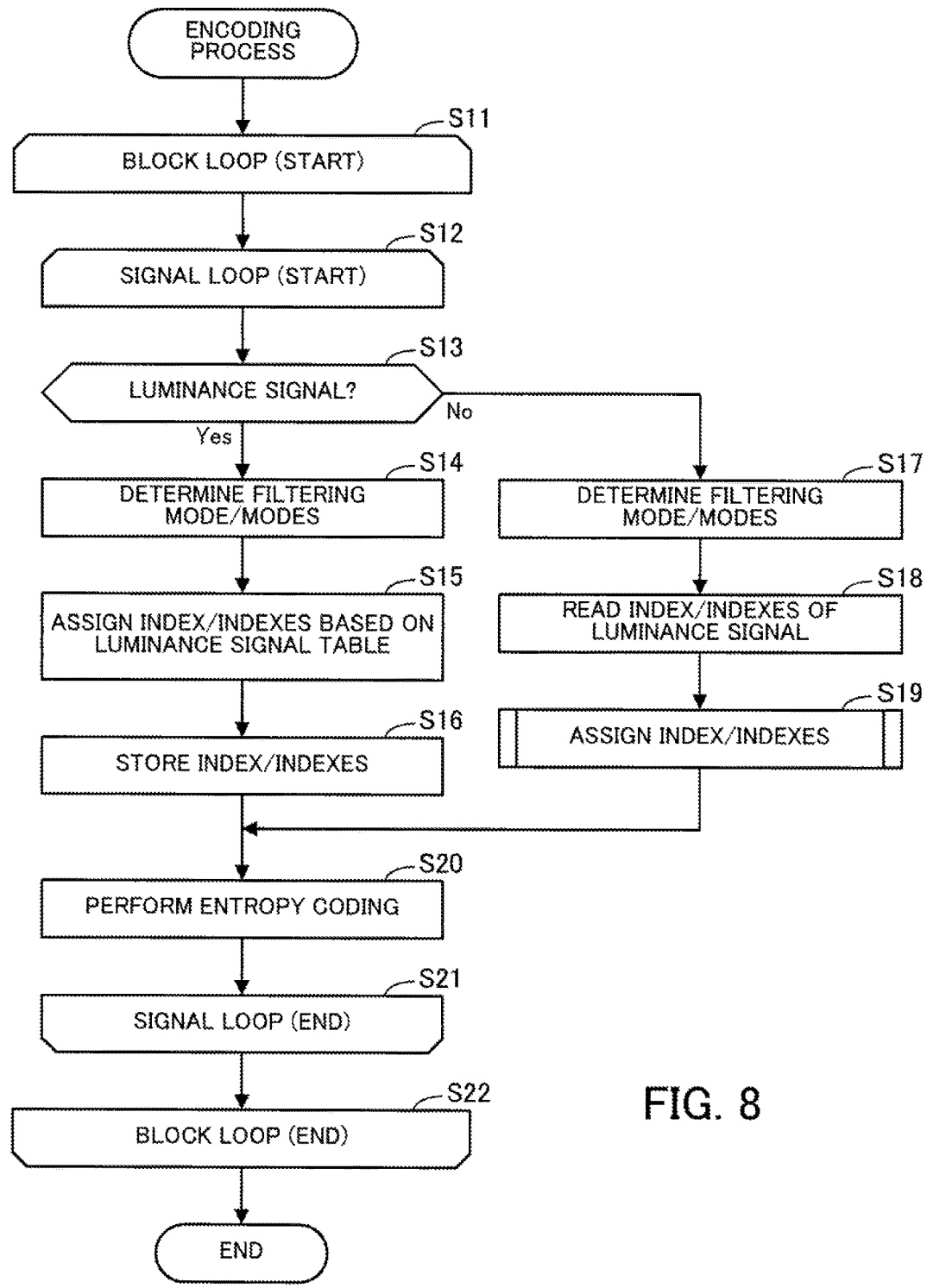
FIG. 8 is a flowchart illustrating an example of a filtering mode encoding procedure.

A filtering mode encoding procedure carried out by the image encoding device 100 is described next with reference to flowcharts. FIG. 8 is a flowchart illustrating an example of the filtering mode encoding procedure.

[Step S11] A block loop process consisting of steps S11 to S22 is performed for each block of a decoded image output from the deblocking filter 107.

[Step S12] A signal loop process consisting of steps S12 to S21 is performed for the block selected as an encoding target.

[Step S13] The SAO unit 108 determines whether to process the luminance signal or the color difference signals. The process moves to step S14 when the luminance signal is processed. The process moves to step S17 when the color difference signals are processed. Note that, for each single block, the SAO unit 108 first processes the luminance signal, and then processes the color difference signals.

[Step S14] The SAO unit 108 determines each filtering mode of the luminance signal based on the luminance signal of the block and its neighboring blocks in the decoded image. Specifically, the SAO unit 108 determines a SAO type for the luminance signal. In addition, when the SAO type is determined to be edge offset, the SAO unit 108 then determines an edge offset class for the luminance signal.

[Step S15] Based on the assignment table 131*a* for the luminance signal, the index generation unit 121 assigns an index to sao_type_idx_luma, which indicates the SAO type of the luminance signal. In the case where the SAO type is edge offset, the index generation unit 121 also assigns an index to sao_eo_class_luma, which indicates the edge offset class of the luminance signal, based on the assignment table 131*b* for the luminance signal.

[Step S16] The index generation unit 121 stores, in the index storage unit 122, the index/indexes assigned in step S15.

[Step S17] Based on the color difference signals of the block and its neighboring blocks, the SAO unit 108 determines each filtering mode of the color difference signals. Specifically, the SAO unit 108 determines a SAO type for the color difference signals. In the case where the SAO type is determined to be edge offset, the SAO unit 108 determines an edge offset class for the color difference signal.

[Step S18] The index generation unit 123 reads, from the index storage unit 122, the index/indexes of the filtering mode/modes stored in step S16 in association with the same block.

[Step S19] The index generation unit 123 assigns an index/indexes to the filtering mode/modes of the color difference signals. Details of this step are described in FIG. 9 below.

[Step S20] The entropy coding unit 113 acquires the index/indexes assigned in step S15 or S19 from the index generation unit 121 or 123. The entropy coding unit 113 performs entropy coding by assigning a code to each of the acquired indexes based on the assignment table 133.

[Step S21] The signal loop process ends when the processing for both the luminance signal and the color difference signals is completed.

[Step S22] The block loop process ends when all the blocks of the decoded image have undergone the signal loop process.

Figure 9:
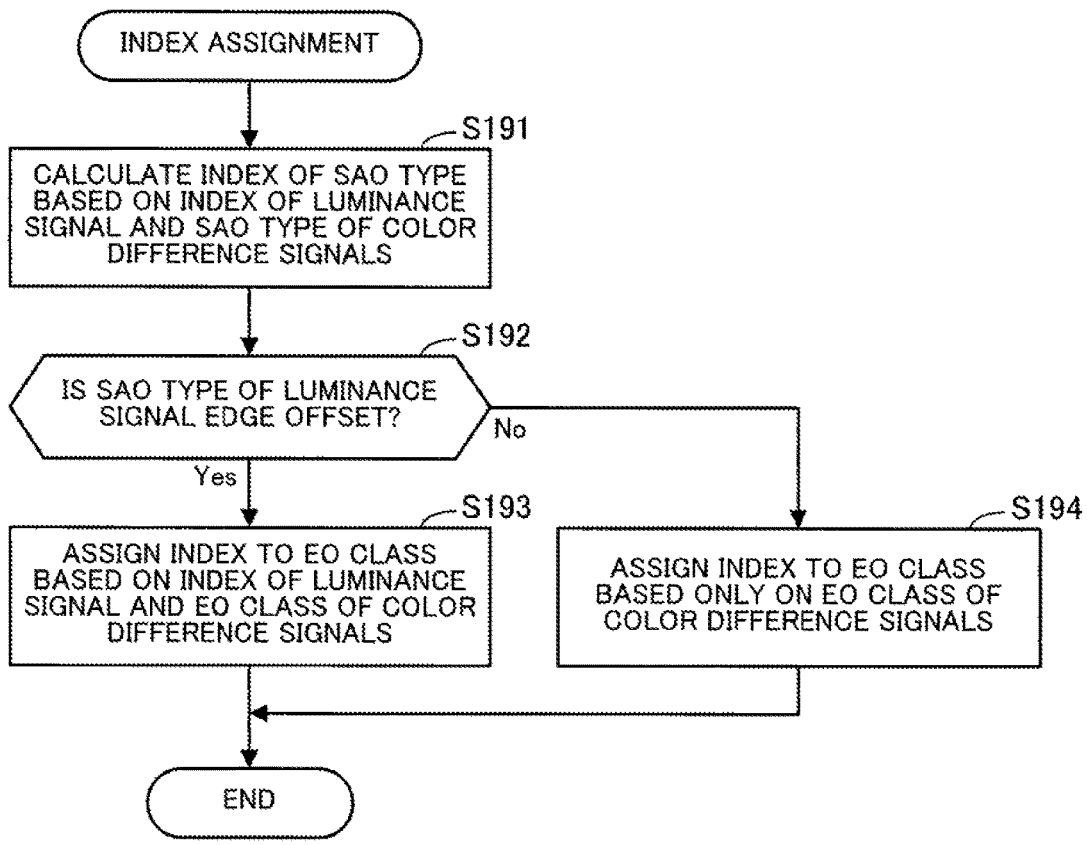
FIG. 9 is a flowchart illustrating an example of an index assigning procedure for the filtering modes of the color difference signals.

FIG. 9 is a flowchart illustrating an example of an index assigning procedure for the filtering modes of the color difference signals. The process of FIG. 9 corresponds to step S19 of FIG. 8.

[Step S191] Based on the index of the SAO type of the luminance signal (sao_type_idx_luma) acquired in step S18 and the SAO type of the color difference signals determined in step S17, the index generation unit 123 assigns an index to sao_type_idx_chroma, which indicates the SAO type of the color difference signals, according to the assignment table 132*a* for the color difference signals.

At this point, if the SAO type of the color difference signals determined in step S17 is edge offset, the index generation unit 123 performs step S192 and the subsequent steps. On the other hand, if the SAO type of the color difference signals is not edge offset, the index generation unit 123 skips steps S192 to S194.

[Step S192] The index generation unit 123 determines whether the SAO type of the luminance signal is edge offset. If it is edge offset, the process moves to step S193. If it is not edge offset, the process moves to step S194.

[Step S193] Based on the index of the edge offset class of the luminance signal (sao_eo_class_luma) acquired in step S18 and the edge offset class of the color difference signals determined in step S17, the index generation unit 123 assigns an index to sao_eo_class_chroma, which indicates the edge offset class of the color difference signals, according to the assignment table 132*b* for the color difference signals.

[Step S194] Based solely on the edge offset class of the color difference signals determined in step S17, the index generation unit 123 assigns an index to sao_eo_class_chroma, which indicates the edge offset class of the color difference signals, according to the assignment table 132*c* for the color difference signals.

Figure 10:
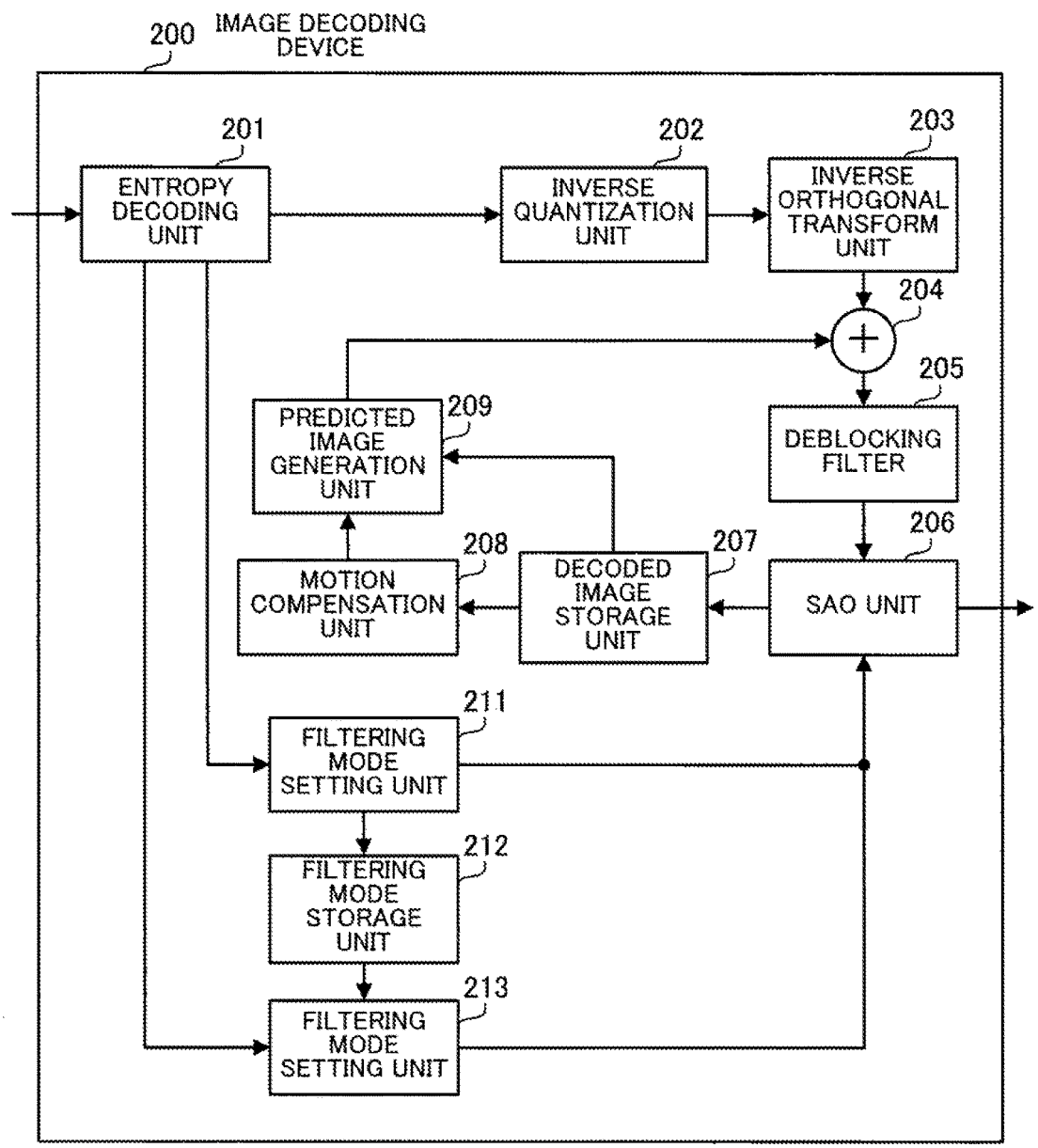
FIG. 10 illustrates a configuration example of an image decoding device according to the second embodiment.

Next described is an image decoding device for decoding a video stream encoded by the above-described image encoding device 100. FIG. 10 illustrates a configuration example of the image decoding device according to the second embodiment. An image decoding device 200 includes an entropy decoding unit 201, an inverse quantization unit 202, an inverse orthogonal transform unit 203, a decoded image generation unit 204, a deblocking filter 205, a SAO unit 206, a decoded image storage unit 207, a motion compensation unit 208, and a predicted image generation unit 209. The image decoding device 200 also includes a filtering mode setting unit 211, a filtering mode storage unit 212, and a filtering mode setting unit 213 as functions for setting each filtering mode in the SAO unit 206.

The entropy decoding unit 201 entropy decodes a video stream input thereto and outputs quantized data. The inverse quantization unit 202 applies inverse-quantization to the quantized data output from the entropy decoding unit 201. The inverse orthogonal transform unit 203 applies an inverse-orthogonal transform to the data output from the inverse quantization unit 202. Herewith, a signal corresponding to a prediction error signal before being encoded is obtained. The decoded image generation unit 204 adds block data of a predicted image output from the predicted image generation unit 209 and a signal output from the inverse orthogonal transform unit 203. Herewith, block data of a decoded image is generated, in which an encoding target block has been reproduced.

The deblocking filter 205 applies a filtering process for reducing block distortion to the block data of the decoded image output from the decoded image generation unit 204. For the block data of the decoded image processed by the deblocking filter 205, the SAO unit 206 performs a process of adding an offset to each pixel value according to filtering modes set by the filtering mode setting units 211 and 213. The decoded image processed by the SAO unit 206 is output as a final output image.

The decoded image storage unit 207 stores the block data of decoded image processed by the SAO unit 206 as block data of a reference picture. The motion compensation unit 208 generates a predicted image using inter prediction by performing motion compensation on the reference picture read from the decoded image storage unit 207 using a decoded motion vector. The predicted image generation unit 209 outputs a predicted image obtained by intra or inter prediction. The predicted image obtained by intra prediction is generated based on data of already decoded neighboring blocks in the reference picture stored in the decoded image storage unit 207. The predicted image obtained by inter prediction is acquired from the motion compensation unit 208.

The filtering mode setting unit 211 acquires an index of a filtering mode of the luminance signal, entropy decoded by the entropy decoding unit 201. The filtering mode setting unit 211 identifies the filtering mode of the luminance signal based on the acquired index by a procedure the reverse of the index generation unit 121 of FIG. 2. The filtering mode setting unit 211 sets the identified filtering mode in the SAO unit 206, and also stores it in the filtering mode storage unit 212. The filtering mode storage unit 212 temporarily stores the filtering mode identified by the filtering mode setting unit 211.

The filtering mode setting unit 213 acquires an index of a filtering mode of the color difference signals, entropy decoded by the entropy decoding unit 201. By a procedure the reverse of the index generation unit 123 of FIG. 2, the filtering mode setting unit 213 identifies the filtering mode of the color difference signals based on the filtering mode of the luminance signal stored in the filtering mode storage unit 212 and the index of the filtering mode of the color difference signals acquired from the entropy decoding unit 201. The filtering mode setting unit 213 sets the identified filtering mode of the color difference signals in the SAO unit 206.

Figure 11:
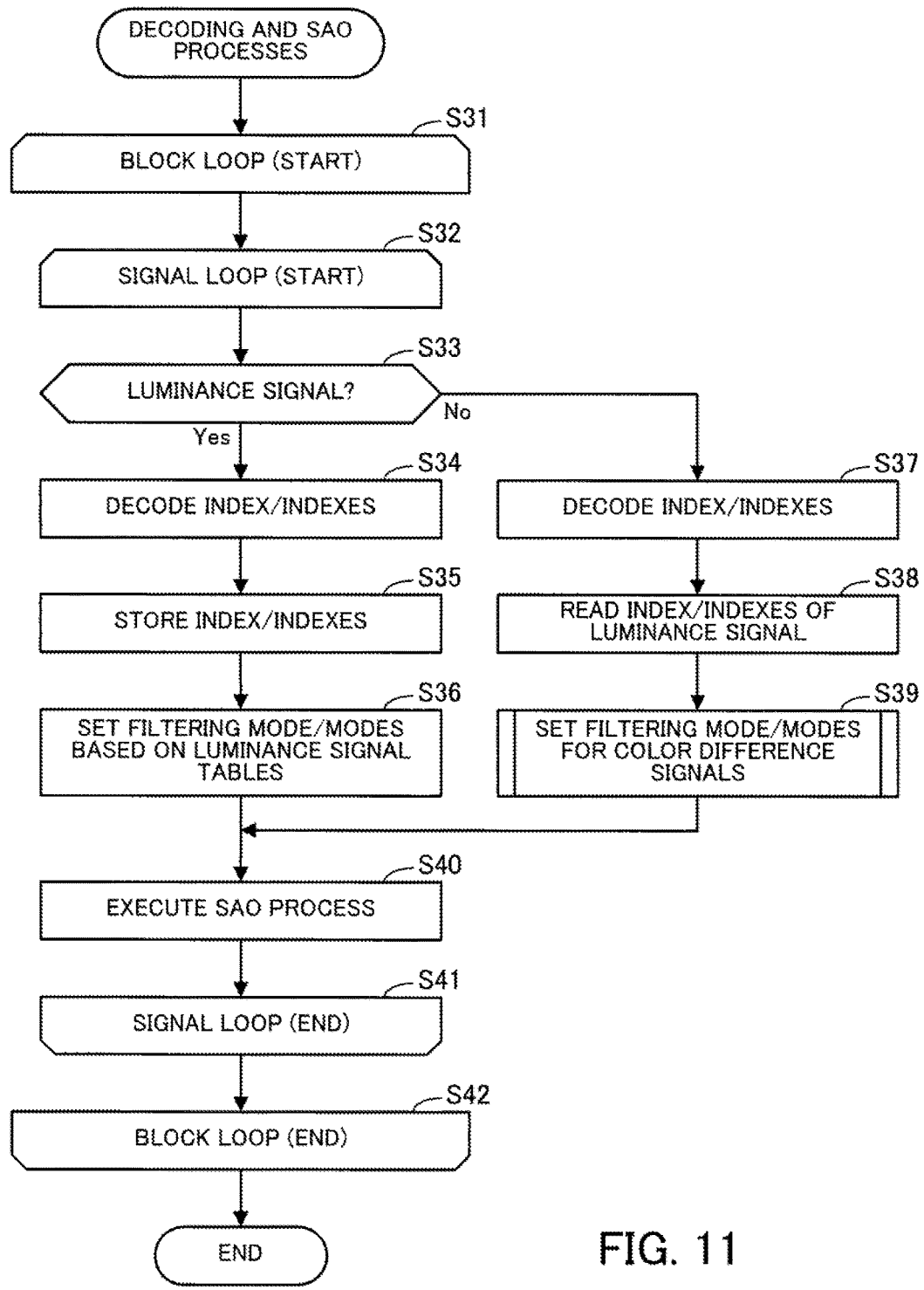
FIG. 11 is a flowchart illustrating an example of filtering mode decoding and SAO procedures performed by the image decoding device.

FIG. 11 is a flowchart illustrating an example of filtering mode decoding and SAO procedures performed by the image decoding device.

[Step S31] A block loop process consisting of steps S31 to S42 is performed for each block of one picture in a video stream input thereto.

[Step S32] A signal loop process consisting of steps S32 to S41 is performed for the block selected as a decoding target.

[Step S33] The entropy decoding unit 201 determines whether to process the luminance signal or the color difference signals. The process moves to step S34 when the luminance signal is processed. The process moves to step S37 when the color difference signals are processed. Note that, for each single block, the entropy decoding unit 201 first processes the luminance signal, and then processes the color difference signals.

[Step S34] The entropy decoding unit 201 decodes an index indicating each filtering mode of the luminance signal. Specifically, the entropy decoding unit 201 extracts, from the video stream, a code of sao_type_idx_luma, which indicates a SAO type of the luminance signal. The entropy decoding unit 201 converts the extracted code into an index of sao_type_idx_luma based on an assignment table. In the case where the SAO type is edge offset, the entropy decoding unit 201 extracts, from the video stream, a code of sao_eo_class_luma, which indicates an edge offset class of the luminance signal. The entropy decoding unit 201 converts the extracted code into an index of sao_eo_class_luma based on an assignment table. Note that these assignment tables hold information indicating correspondence relationships equivalent to those held in the assignment table 133 of FIG. 7, and are preliminarily stored in a storage unit of the image decoding device 200. The filtering mode setting unit 211 acquires the decoded index/indexes from the entropy decoding unit 201.

[Step S35] The filtering mode setting unit 211 stores, in the filtering mode storage unit 212, the index/indexes of the filtering mode/modes (sao_type_idx_luma, and if applicable sao_eo_class_luma) acquired in step S34.

[Step S36] Based on the index/indexes acquired in step S34, the filtering mode setting unit 211 identifies each filtering mode of the luminance signal. Specifically, based on the acquired index of sao_type_idx_luma, the filtering mode setting unit 211 identifies a SAO type of the luminance signal according to an assignment table for the luminance signal. The assignment table holds information indicating correspondence relationships equivalent to that held in the assignment table 131*a* of FIG. 4, and is preliminarily stored in the storage unit of the image decoding device 200. In the case where the SAO type is edge offset, the filtering mode setting unit 211 identifies, based on the acquired sao_eo_class_luma, an edge offset class of the luminance signal according to an assignment table for the luminance signal. The assignment table holds information indicating correspondence relationships equivalent to those held in the assignment table 131*b* of FIG. 4, and is preliminarily stored in the storage unit of the image decoding device 200. The filtering mode setting unit 211 sets, in the SAO unit 206, the identified filtering mode/modes (the SAO type, and if applicable the edge offset class) of the luminance signal.

[Step S37] The entropy decoding unit 201 decodes an index indicating each filtering mode of the color difference signals. Specifically, the entropy decoding unit 201 extracts, from the video stream, a code of sao_type_idx_chroma, which indicates a SAO type of the color difference signals. The entropy decoding unit 201 converts the extracted code into an index of sao_type_idx_chroma based on an assignment table. In the case where the SAO type is edge offset, the entropy decoding unit 201 extracts, from the video stream, a code of sao_eo_class_chroma, which indicates an edge offset class of the color difference signals. The entropy decoding unit 201 converts the extracted code into an index of sao_eo_class_chroma based on an assignment table. Note that these assignment tables hold information indicating correspondence relationships equivalent to those held in the assignment table 133 of FIG. 7, and are preliminarily stored in the storage unit of the image decoding device 200. The filtering mode setting unit 213 acquires the decoded index/indexes from the entropy decoding unit 201.

[Step S38] The filtering mode setting unit 213 reads, from the filtering mode storage unit 212, the index/indexes of the filtering mode/modes (sao_type_idx_luma, and if applicable sao_eo_class_luma) stored in step S35.

[Step S39] The filtering mode setting unit 213 identifies a filtering mode/modes of the color difference signals, and sets the determined filtering mode/modes in the SAO unit 206. Details of this step are described in FIG. 12 below.

[Step S40] According to the filtering mode/modes set in step S36 or S39, the SAO unit 206 performs a SAO filtering process on the luminance signal or color difference signals of the block. That is, in the case where the filtering mode/modes set in step S36 are being referenced, the filtering process is carried out for the luminance signal. On the other hand, in the case where the filtering mode/modes set in step S39 are being referenced, the filtering process is carried out for the color difference signals.

[Step S41] The signal loop process ends when the processing of both the luminance signal and the color difference signals is completed.

[Step S42] The block loop process ends when all the blocks of the single picture have undergone the signal loop process.

Figure 12:
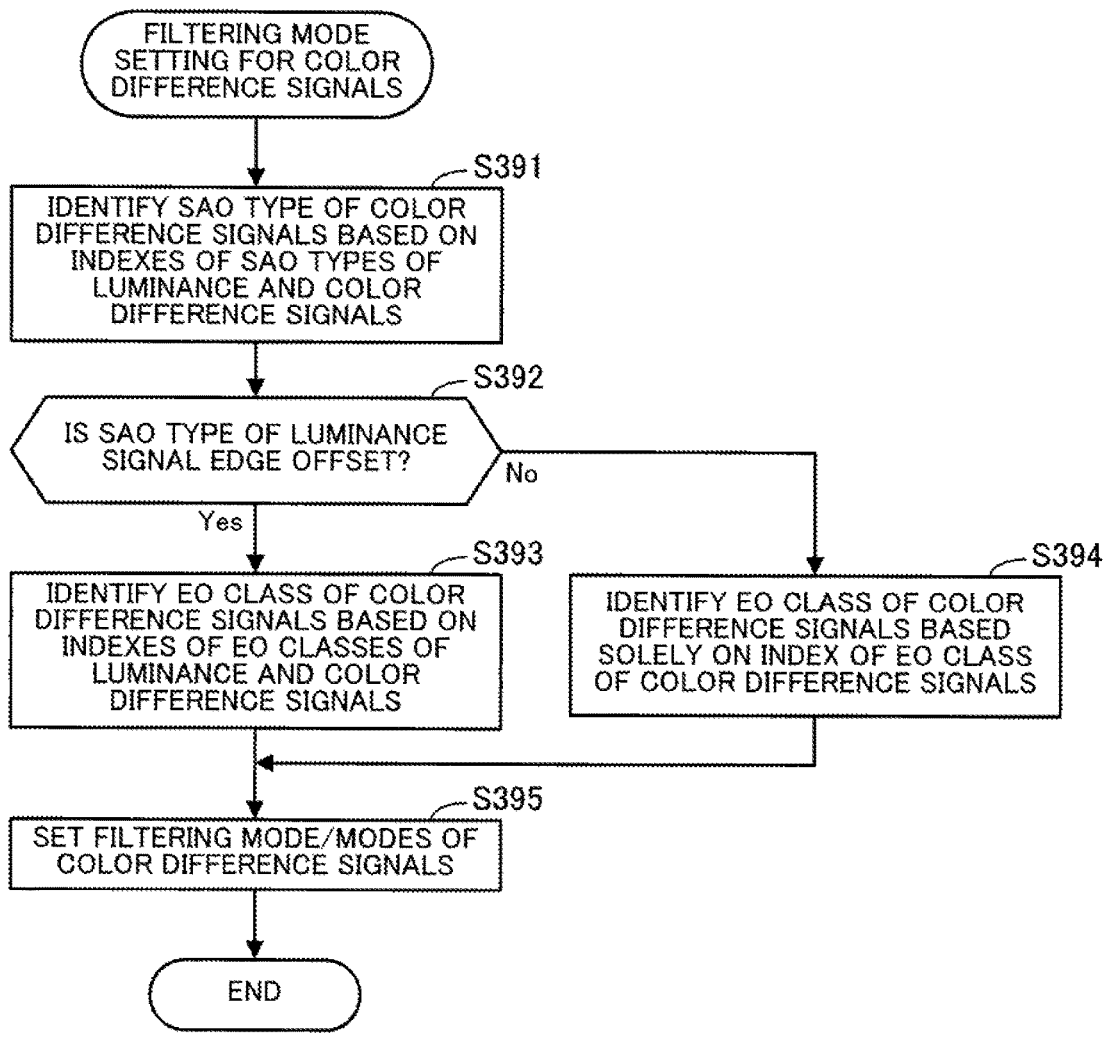
FIG. 12 is a flowchart illustrating an example of a filtering mode setting procedure for the color difference signals.

FIG. 12 is a flowchart illustrating an example of a filtering mode setting procedure for the color difference signals. The process of FIG. 12 corresponds to step S39 of FIG. 11.

[Step S391] Based on the index of sao_type_idx_chroma acquired in step S37 and the index of sao_type_idx_luma read in step S38, the filtering mode setting unit 213 identifies a SAO type of the color difference signals according to an assignment table. This assignment table holds information indicating correspondence relationships equivalent to that held in the assignment table 132a of FIG. 6, and is preliminarily stored in the storage unit of the image decoding device 200.

At this point, when having identified that the SAO type of the color difference signals is edge offset, the filtering mode setting unit 213 performs step S392 and the subsequent steps. On the other hand, if the SAO type of the color difference signals is not edge offset, the filtering mode setting unit 213 skips steps S392 to S394.

[Step S392] The filtering mode setting unit 213 determines whether the SAO type of the luminance signal is edge off. If it is edge offset, the process moves to step S393. If it is not edge offset, the process moves to step S394.

[Step S393] Based on the index of sao_eo_class_chroma acquired in step S37 and the index of sao_eo_class_luma read in step S38, the filtering mode setting unit 213 identifies an edge offset class of the color difference signals according to an assignment table. This assignment table holds information indicating correspondence relationships equivalent to that held in the assignment table 132b of FIG. 6, and is preliminarily stored in the storage unit of the image decoding device 200.

[Step S394] Based solely on the index of sao_eo_class_luma read in step S38, the filtering mode setting unit 213 identifies an edge offset class of the color difference signals according to an assignment table. This assignment table holds information indicating correspondence relationships equivalent to that held in the assignment table 132c of FIG. 6, and is preliminarily stored in the storage unit of the image decoding device 200.

[Step S395] The filtering mode setting unit 213 sets, in the SAO unit 206, the identified filtering mode/modes (the SAO type, and if applicable the edge offset class) of the color difference signals.

According to the procedures of FIGS. 11 and 12 above, the image decoding device 200 is able to normally decode the video stream generated by the image encoding device 100.

Note that, according to the first embodiment above, the SAO type and the edge offset class of each signal are defined as discrete syntax elements. However, the SAO type and the edge offset class may be defined as a single syntax element. For example, sao_type_idx_chroma and sao_eo_class_chroma are unified as sao_type_idx_chroma, which is used to transmit both the SAO type and the edge offset class to the decoding side.

In this case, an index is assigned to sao_type_idx_chroma, for example, in the following manner. If the SAO types of the luminance signal and the color difference signals are the same and the edge offset classes of the luminance signal and the color difference signals are the same, a minimum index of 0 is assigned to sao_type_idx_chroma. If the SAO type of the luminance signal and that of the color difference signals are different, a comparatively large index is assigned to sao_type_idx_chroma. Then, an intermediate index is assigned to sao_type_idx_chroma if, for example, the SAO type of the luminance signal and that of the color difference signals are the same but the edge offset class of the luminance signal and that of the color difference signals are different. By assigning indexes in this manner, it is more likely that, for the entire input image, codes with low bit numbers are incorporated into the video stream as codes corresponding to sao_type_idx_chroma. As a result, the amount of the video stream data is reduced.

Figure 13:
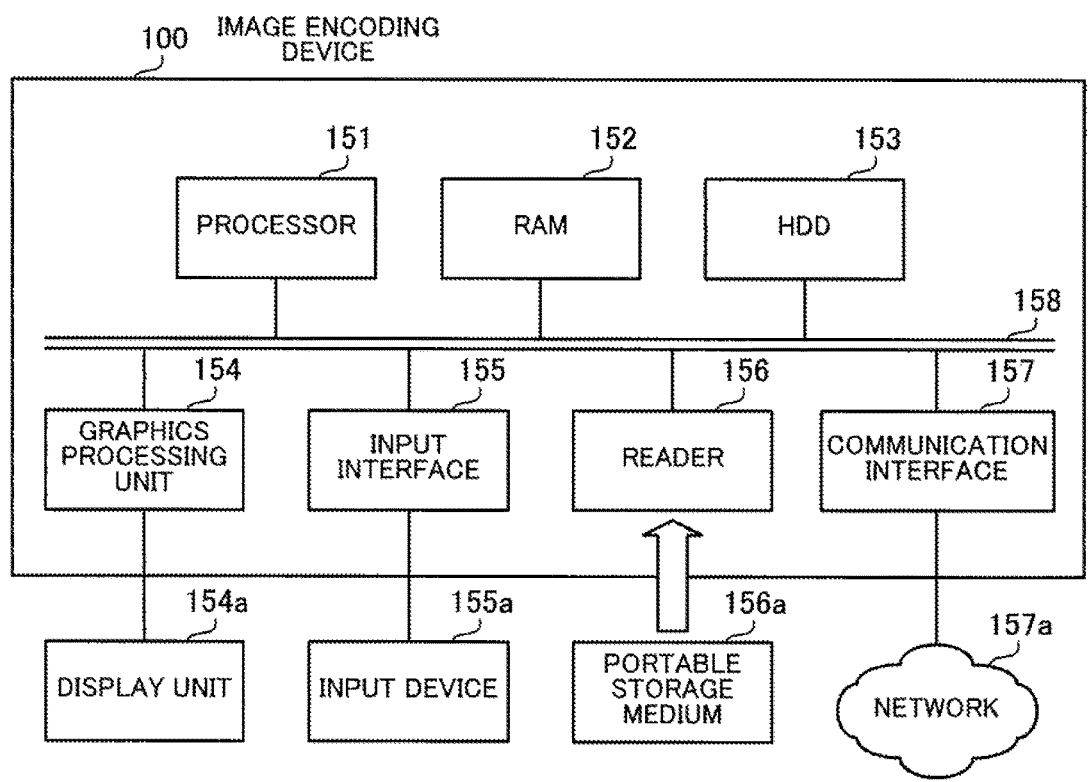
FIG. 13 illustrates an example of a hardware configuration with the image encoding device implemented as a computer.

Each of the image encoding device 100 and the image decoding device 200 above is implemented as a semiconductor device, such as a SoC (system-on-a-chip). In such a case, the individual processing components of FIGS. 2 and 10 are implemented as electric circuits, such as semiconductor circuits. In addition, at least one of the image encoding device 100 and the image decoding device 200 may be implemented as a computer illustrated in FIG. 13. FIG. 13 illustrates an example of a hardware configuration with the image encoding device implemented as a computer. Overall control of the image encoding device 100 is exercised by a processor 151. The processor 151 may be a multi-processor. The processor 151 is, for example, a CPU (central processing unit), a MPU (micro processing unit), a DSP (digital signal processor), an ASIC (application specific integrated circuit), a PLD (programmable logic device), or a combination of two or more of these.

To the processor 151, RAM (random access memory) 152 and a plurality of peripherals are connected via a bus 158. The RAM 152 is used as a main storage device of the image encoding device 100. The RAM 152 temporarily stores at least part of an OS (operating system) program and application programs to be executed by the processor 151. The RAM 152 also stores therein various types of data to be used by the processor 151 for its processing.

The peripherals connected to the bus 158 include a HDD (hard disk drive) 153, a graphics processing unit 154, an input interface 155, a reader 156, and a communication interface 157. The HDD 153 is used as a secondary storage device of the image encoding device 100. The HDD 153 stores therein the OS program, application programs, and various types of data. Note that a non-volatile storage device such as a SSD (solid state drive) may be used as a secondary storage device in place of the HDD 153. To the graphics processing unit 154, a display unit 154a is connected. According to an instruction from the processor 151, the graphics processing unit 154 displays an image on the display unit 154a. A liquid crystal display or an organic EL (electroluminescence) display, for example, may be used as the display unit 154a.

To the input interface 155, an input device 155a is connected. The input interface 155 transmits signals output from the input device 155a to the processor 151. The input device 155a is, for example, a keyboard or a pointing device. Examples of the pointing device include a mouse, a touch panel, a tablet, a touch-pad, and a track ball. Into the reader 156, a portable storage medium 156a is loaded. The reader 156 reads data recorded on the portable storage medium 156a and transmits the read data to the processor 151. The portable storage medium 156a may be an optical disk, a magneto optical disk, or semiconductor memory, for example. The communication interface 157 transmits and receives data to and from different devices via a network 157a.

The hardware configuration described above achieves processing functions of the image encoding device 100. Note that the processing functions of the image decoding device 200 may also be implemented using the same hardware configuration as illustrated in FIG. 13.

Next described are modifications with partial alterations made to the above-described processes of the second embodiment. An image encoding device and image decoding device of each of the following modifications have the same configurations of basic processing functions as those illustrated in FIGS. 2 and 10, respectively. Therefore, the modifications are described below using the same reference numerals as those in FIGS. 2 and 10.

(c) First Modification

A first modification introduces, as a new syntax element, a direct flag indicating whether a filtering mode of the color difference signals is the same as that of the luminance signal. The direct flag is coded in one bit and incorporated into a video stream. If the direct flag indicates that the filtering mode of the color difference signals is the same as that of the luminance signal, information indicating the filtering mode of the color difference signals is not incorporated into the video stream. On the other hand, only when the direct flag indicates that the filtering mode of the color difference signals is different from that of the luminance signal, an index of the filtering mode of the color difference signals is created, and based on the index, information indicating the filtering mode is then incorporated into the video stream. Due to a correlation between the luminance signal and the color difference signals, the filtering mode of the color difference signals is likely to be the same as that of the luminance signal. Therefore, for an entire input image, information indicating the filtering mode of the color difference signals is likely not to be incorporated into the video stream. In addition, there is no need to generate each index indicating the filtering mode of the color difference signals for the case where the filtering mode of the color difference signals is the same as that of the luminance signal. Therefore, the bit number of codes to be assigned to the filtering mode of the color difference signals is reduced by an order of magnitude compared to the case of the second embodiment. For these reasons, it is possible to further reduce the amount of video stream data.

Next described are, as an example, processes performed in the case where a direct flag has been introduced, which indicates whether the SAO type of the color difference signals is the same as that of the luminance signal. Assume here that the direct flag is set to "1" if the SAO type of the color difference signals is the same as that of the luminance signal, and set to "0" if the SAO types of these signals are different.

Figure 14:
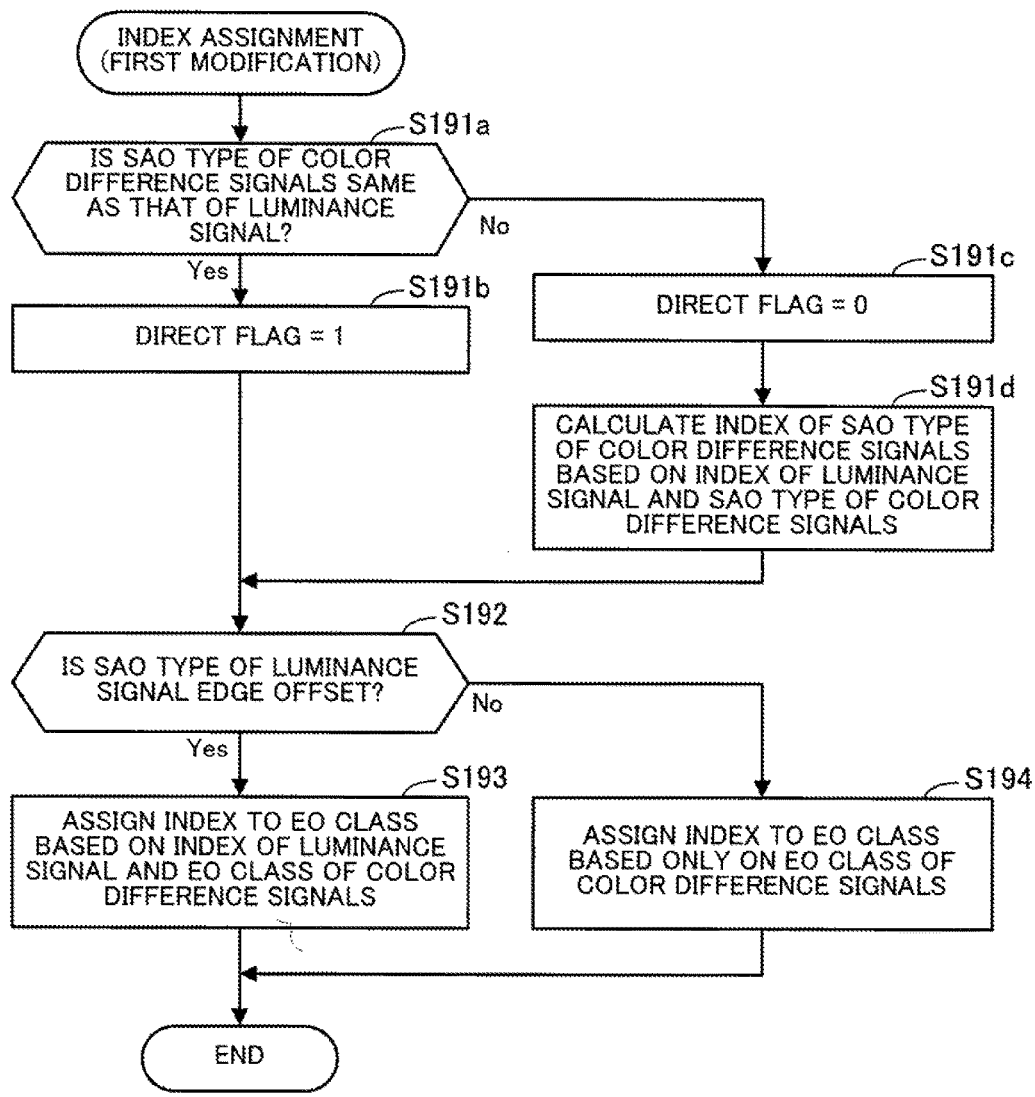
FIG. 14 is a flowchart illustrating an example of an index assigning procedure for the filtering modes of the color difference signals, performed by an image encoding device of a first modification.

FIG. 14 is a flowchart illustrating an example of an index assigning procedure for the filtering modes of the color difference signals, performed by the image encoding device of the first modification. According to the first modification, the procedure of FIG. 9 is partially modified as illustrated in FIG. 14. Specifically, steps S191a to S191d are performed in place of step S191.

[Step S191a] The index generation unit 123 determines whether the SAO type of the color difference signals determined in step S17 of FIG. 8 is the same as the SAO type of the luminance signal determined in step S14. The process moves to step S191b if the SAO types are the same. The process moves to step S191c if the SAO types are different from each other.

[Step S191b] The index generation unit 123 sets the direct flag to "1". Note that, in this case, no index indicating the SAO type of the color difference signals is generated.

[Step S191c] The index generation unit 123 sets the direct flag to "0".

[Step S191d] Based on the index of the SAO type of the luminance signal (sao_type_idx_luma) acquired in step S18 of FIG. 8 and the SAO type of the color difference signals determined in step S17, the index generation unit 123 assigns an index to sao_type_idx_chroma, which indicates a SAO type of the color difference signals, according to an assignment table for the color difference signals. As this assignment table, an assignment table illustrated in FIG. 15 below is used.

Subsequently, the index generation unit 123 performs step S192 and the subsequent steps if the SAO type of the color difference signals determined in step S17 is edge offset. On the other hand, if the SAO type of the color difference signals is not edge offset, the index generation unit 123 skips steps S192 to S194. In the subsequent step S20, the entropy coding unit 113 encodes the direct flag in addition to the index of each filtering mode.

Figure 15:
FIG. 15 illustrates an example of an assignment table for color difference signals.

FIG. 15 illustrates an example of an assignment table for the color difference signals. The storage unit 130 of the image encoding device 100 stores therein an assignment table 132a1 of FIG. 15 in place of the assignment table 132a illustrated in FIG. 6. In step S191d of FIG. 14, the index generation unit 123 calculates the index to be assigned to the SAO type of the color difference signals based on the assignment table 132a1. As illustrated in FIG. 15, indexes assigned to the SAO types of the color difference signals take only two values. As a result, the bit number of codes for the index assignment in encoding is reduced compared to the case of the second embodiment.

Figure 16:
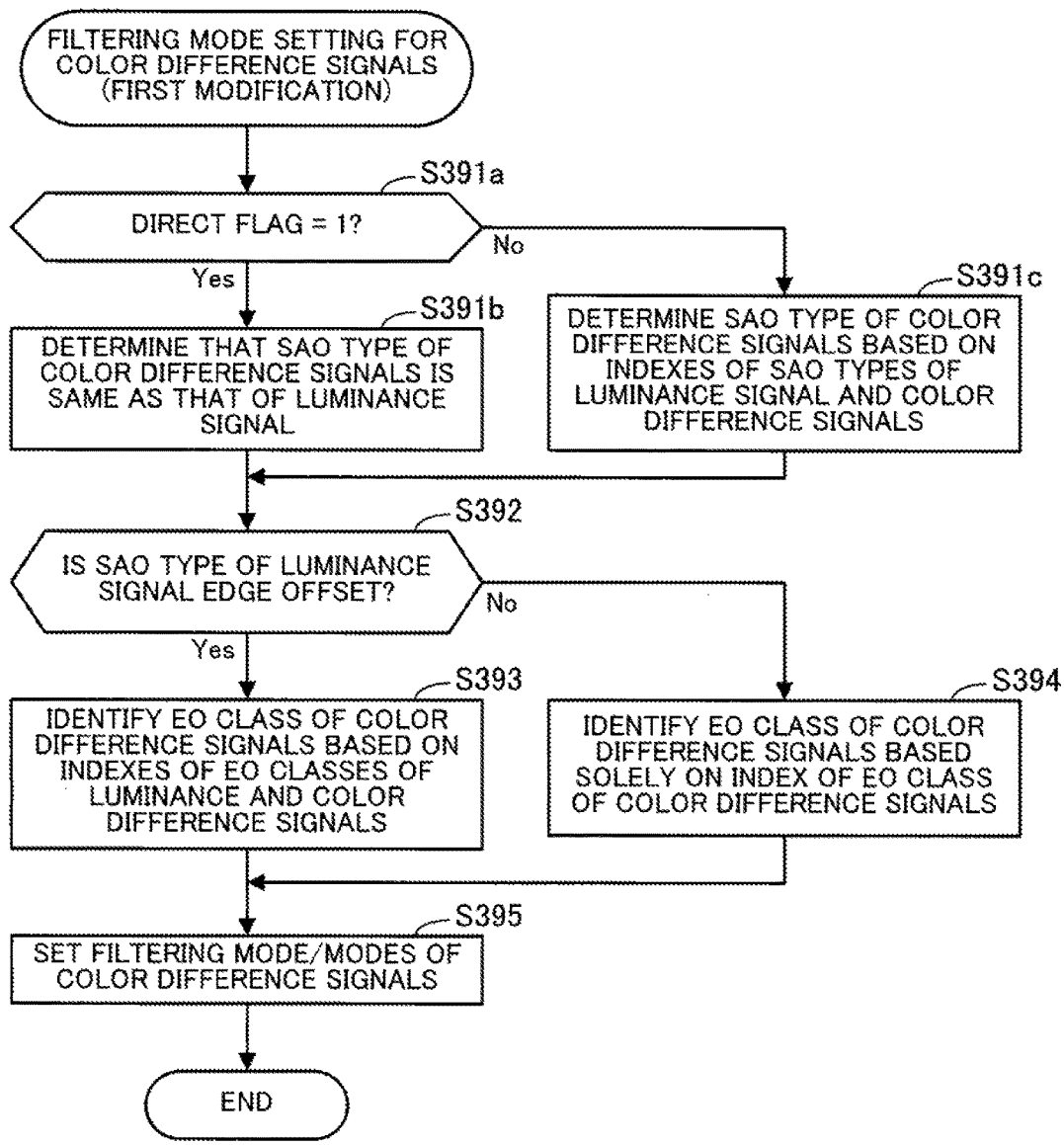
FIG. 16 is a flowchart illustrating an example of a filtering mode setting procedure for the color difference signals, performed by an image decoding device according to the first modification.

FIG. 16 is a flowchart illustrating an example of a filtering mode setting procedure for the color difference signals, performed by the image decoding device according to the first modification. In the first modification, the entropy decoding unit 201 of the image decoding device 200 decodes a direct flag in step S37 of FIG. 11, in addition to an index indicating each filtering mode of the color difference signals. In this regard, depending on the value of the direct flag, a code corresponding to the SAO type of the color difference signals may be absent in the video stream and, therefore, no decoding is performed to otherwise obtain an index of the SAO type based on the code.

Further, according to the first modification, the procedure of FIG. 12 is partially modified as illustrated in FIG. 16. Specifically, steps S391a to S391c are performed in place of step S391.

[Step S391a] The filtering mode setting unit 213 acquires a direct flag from the entropy decoding unit 201 and determines whether the direct flag is set to "1". If the direct flag is set to "1", the filtering mode setting unit 213 moves to step S391b. If the direct flag is set to "0", the filtering mode setting unit 213 moves to step S391c.

[Step S391b] The filtering mode setting unit 213 determines that the SAO type of the color difference signals is the same as that of the luminance signal identified in step S36 of FIG. 11.

[Step S391c] Based on the index of sao_type_idx_chroma acquired in step S37 and the index of sao_type_idx_luma read in step S38, the filtering mode setting unit 213 identifies the SAO type of the color difference signals according to an assignment table. This assignment table holds information indicating correspondence relationships equivalent to that held in the assignment table 132a1 of FIG. 15, and is preliminarily stored in the storage unit of the image decoding device 200.

Subsequently, when having identified that the SAO type of the color difference signals is edge offset, the filtering mode setting unit 213 performs step S392 and the subsequent steps. On the other hand, if the SAO type of the color difference signals is not edge offset, the filtering mode setting unit 213 skips steps S392 to S394.

(d) Second Modification

A second modification is a modification of the second embodiment above, and is directed to a system for determining, in the encoding process, the edge offset class of a given block based on the edge offset classes of its neighboring blocks. For example, in the case where the edge offset class of the luminance signal is "1" (edge angle=90 degrees), the edge offset class of the color difference signals is likely to be "1". For this reason, in the assignment table 132b of FIG. 6, the minimum index is assigned to each edge offset class of the color difference signals when the edge offset class of the color difference signals is the same as that of the luminance signal. On the other hand, the edge offset class of the color difference signals is less likely to be "0" (edge angle=0 degrees), which has the largest difference in edge angle relative to the edge offset class of the luminance signal (i.e., edge angle=90 degrees). For this reason, in the assignment table 132b, the maximum index is assigned to each edge offset class of the color difference signals when the edge offset class of the color difference signals has the largest difference in edge angle relative to the edge offset class of the luminance signal.

However, it is not sure which one of the following edge offset classes of the color difference signals is more likely to be: "2" (edge angle=135 degrees) and "3" (edge angle=45 degrees). The likelihood depends on an image on blocks. Therefore, according to the second modification, when the edge offset class of the color difference signals has an intermediate difference in edge angle relative to the edge offset class of the luminance signal, an index to be assigned to the edge offset class of an encoding target block is determined based on the state of neighboring blocks around the target block.

Figure 17:
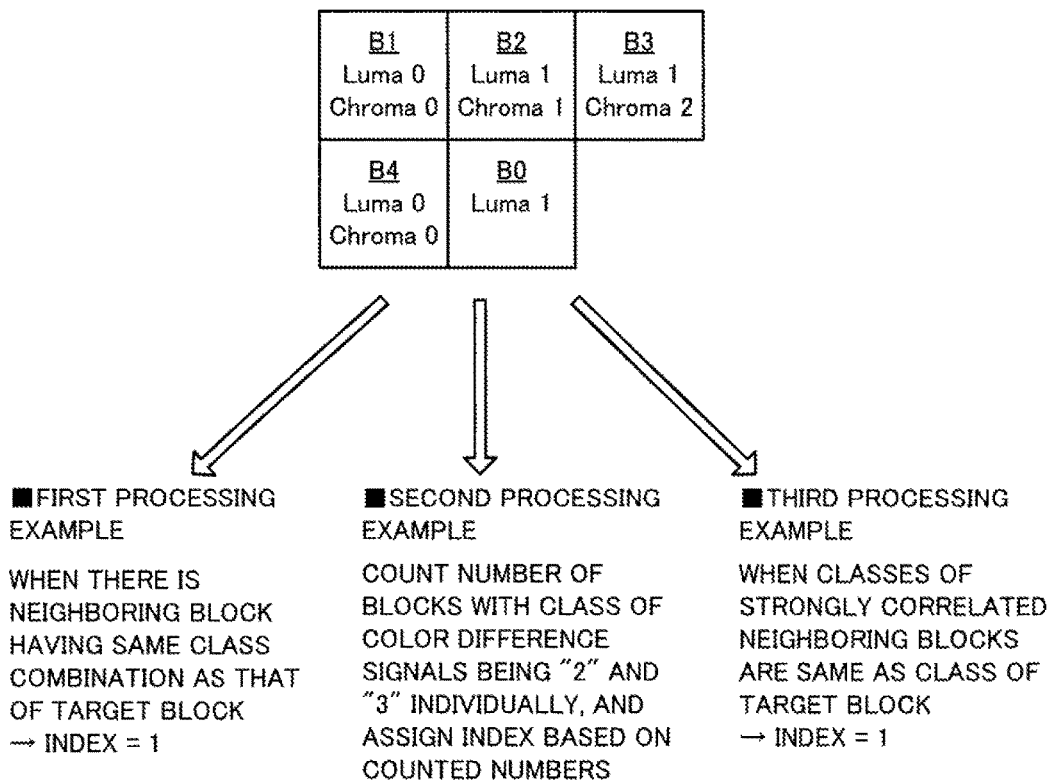
FIG. 17 illustrates processing examples of determining an edge offset class based on state of neighboring blocks.

FIG. 17 illustrates processing examples of determining an edge offset class based on the state of the neighboring blocks. The following describes processing procedures performed by the image encoding device 100. Note that, in FIG. 17, "Luma 1" indicates that the edge offset class of the luminance signal (sao_eo_class_luma) of a corresponding block is "1". In addition, "Chroma 1" indicates that the edge offset class of the color difference signals (sao_eo_class_chroma) of a corresponding block is "1".

In FIG. 17, a block B0 is a current encoding target block. Blocks B1, B2, B3, and B4 bordering the target block B0 on the upper-left, upper, upper-right, and left sides, respectively, are blocks having already undergone encoding when the block B0 is an encoding target. Therefore, in the process of encoding the block B0, the image encoding device 100 is able to acquire decoded image data of the neighboring blocks B1 to B4 as well as the edge offset classes of the color difference signals determined for the individual blocks B1 to B4.

According to the second modification, the image encoding device 100 first sets a provisional index to the edge offset class of the color difference signals based on the assignment table 132b of FIG. 6. In this regard, in the case where "1" or "2" is set as the provisional index, the image encoding device 100 resets the index according to one of the following first to third processing examples. According to FIG. 17, as for the encoding target block B0, the edge offset class of the luminance signal is "1". Therefore, if the edge offset class of the color difference signals is either "2" or "3", one of the following processes is performed.

First to third processes are described here as examples. The first and second processing examples are directed to determine an index to be assigned to the edge offset class of the encoding target block based on the state of the edge offset classes determined for neighboring blocks of the encoding target block. According to the first and second processing examples, a lower index (for example, 1 is chosen between "1" and "2") is basically assigned to an edge offset class determined for the block B0 if one or more of the neighboring blocks have the same edge offset class as that of the block B0.

Note that the edge offset classes already determined for the neighboring blocks are acquired from, in encoding, already encoded blocks and, in decoding, already decoded blocks. Therefore, no mismatches of edge offset classes would occur between the image encoding device 100 and the image decoding device 200.

First, according to the first processing example, when there is a neighboring block having the same pattern of edge angle deviation observed between the edge offset classes of the luminance signal and the color difference signals of the block B0, a low index is assigned to the edge offset class determined for the block B0. Specifically, the image encoding device 100 assigns an index of "1" to the edge offset class of the color difference signals if one or more of the neighboring blocks B1 to B4 have the same combination of edge offset classes as the block B0. Assume in FIG. 17 that, as for the block B0, the edge offset class of the luminance signal is "1" and the edge offset class of the color difference signals is "2". In this case, because the block B3 having the same combination of edge offset classes is present, an index of "1" is assigned to the edge offset class of the color difference signals of the block B0.

Next, according to the second processing example, the image encoding device 100 counts, amongst the neighboring blocks B1 to B4, the number of blocks with the edge offset class of the color difference signals being "2" and the number of blocks with the edge offset class of the color difference signals being "3". Then, the image encoding device 100 assigns a lower index (for example, "1" is chosen between "1" and "2") to an edge offset class of a larger number of blocks. In the example of FIG. 17, amongst the neighboring blocks B1 to B4, the number of blocks with the edge offset class of the color difference signals being "2" is one while the number of blocks with the edge offset class of the color difference signals being "3" is zero. Therefore, the image encoding device 100 assigns an index of "1" if the edge offset class of the color difference signals of the block B0 is "2", and assigns an index of "2" if the edge offset class of the color difference signals of the block B0 is "3".

The second processing example above compares only edge offset classes of the color difference signals; however, a comparison may be made for combinations of edge offset classes of the luminance signal and the color difference signals. Specifically, the image encoding device 100 may count, amongst the neighboring blocks B1 to B4, the number of blocks with the edge offset class of the luminance signal being "1" and the edge offset class of the color difference signals being "2" and the number of blocks with the edge offset class of the luminance signal being "1" and the edge offset class of the color difference signals being "3".

On the other hand, the third processing example determines an index to be assigned to the edge offset class of the encoding target block B0 based on pixel values of at least already encoded neighboring blocks. Specifically, based on the color difference signals of at least already encoded neighboring blocks, the image encoding device 100 estimates the angle of a local edge (the angle of the direction in which the edge extends) present around the block B0. The image encoding device 100 assigns an index of "1" to an edge offset class of the color difference signals determined for the block B0 if the estimated edge angle matches the edge angle indicated by the edge offset class of the color difference signals of the block B0.

Amongst neighboring pixels, for example, those adjacent to the block B0 are used for the edge estimation. This raises the possibility of an edge present also in the block B0 being detected. The edge angle is calculated, for example, by the following method using a Sobel filter. For example, the following equations (2-1), (2-2), and (2-3) are used to represent input pixels P used for the edge estimation, a filter coefficient Y of a vertical edge extraction filter, and a filter coefficient X of a horizontal edge extraction filter, respectively.

$$P = \begin{bmatrix} a & b & c \\ d & e & f \\ g & h & i \end{bmatrix} \quad (2\text{-}1)$$

$$Y = \begin{bmatrix} -1 & 0 & 1 \\ -2 & 0 & 2 \\ -1 & 0 & 1 \end{bmatrix} \quad (2\text{-}2)$$

$$X = \begin{bmatrix} -1 & -2 & -1 \\ 0 & 0 & 0 \\ 1 & 2 & 1 \end{bmatrix} \quad (2\text{-}3)$$

Then, a filtering result dy obtained by means of the Sobel filter in the horizontal direction and a filtering result dx obtained by means of the Sobel filter in the vertical direction are expressed by the following equations (3-1) and (3-2).

$$dy = P*Y = -a - 2d - g + c + 2f + i \quad (3\text{-}1)$$

$$dx = P*X = -a - 2d - c + g + 2h + i \quad (3\text{-}2)$$

From these filtering results dy and dx, the amplitude of an edge vector Amp and an edge angle Ang are obtained by the following equations (4-1) and (4-2), respectively.

$$Amp(\vec{D}_{i,j}) = \sqrt{dx_{i,j}^2 + dy_{i,j}^2} \quad (4\text{-}1)$$

$$Ang(\vec{D}_{i,j}) = \frac{180°}{\pi} \times \tan^{-1}\left(\frac{dy_{i,j}}{dx_{i,j}}\right), \quad |Ang(\vec{D}_{i,j})| < 90° \quad (4\text{-}2)$$

It can be seen that the edge vector indicates an angle in a particular range ($Ang_l$, $Ang_h$) when the following equations (5-1) and (5-2) are satisfied.

$$\tan\left(Ang_l \cdot \frac{\pi}{180°}\right) \cdot dx < dy \leq \tan\left(Ang_h \cdot \frac{\pi}{180°}\right) \cdot dx \quad (5\text{-}1)$$

when $dx > 0$ $$\tan\left(Ang_l \cdot \frac{\pi}{180°}\right) \cdot dx > dy \geq \tan\left(Ang_h \cdot \frac{\pi}{180°}\right) \cdot dx \quad (5\text{-}2)$$

when $dx < 0$

According to the first to third processing examples, when the edge offset class of the color difference signals of the block B0 is "2" or "3", an index of "1" is assigned to a more likely setting value for the edge offset class. This reduces the bit number of codes output by encoding, which results in a reduction in the amount of video stream data.

Figure 18:
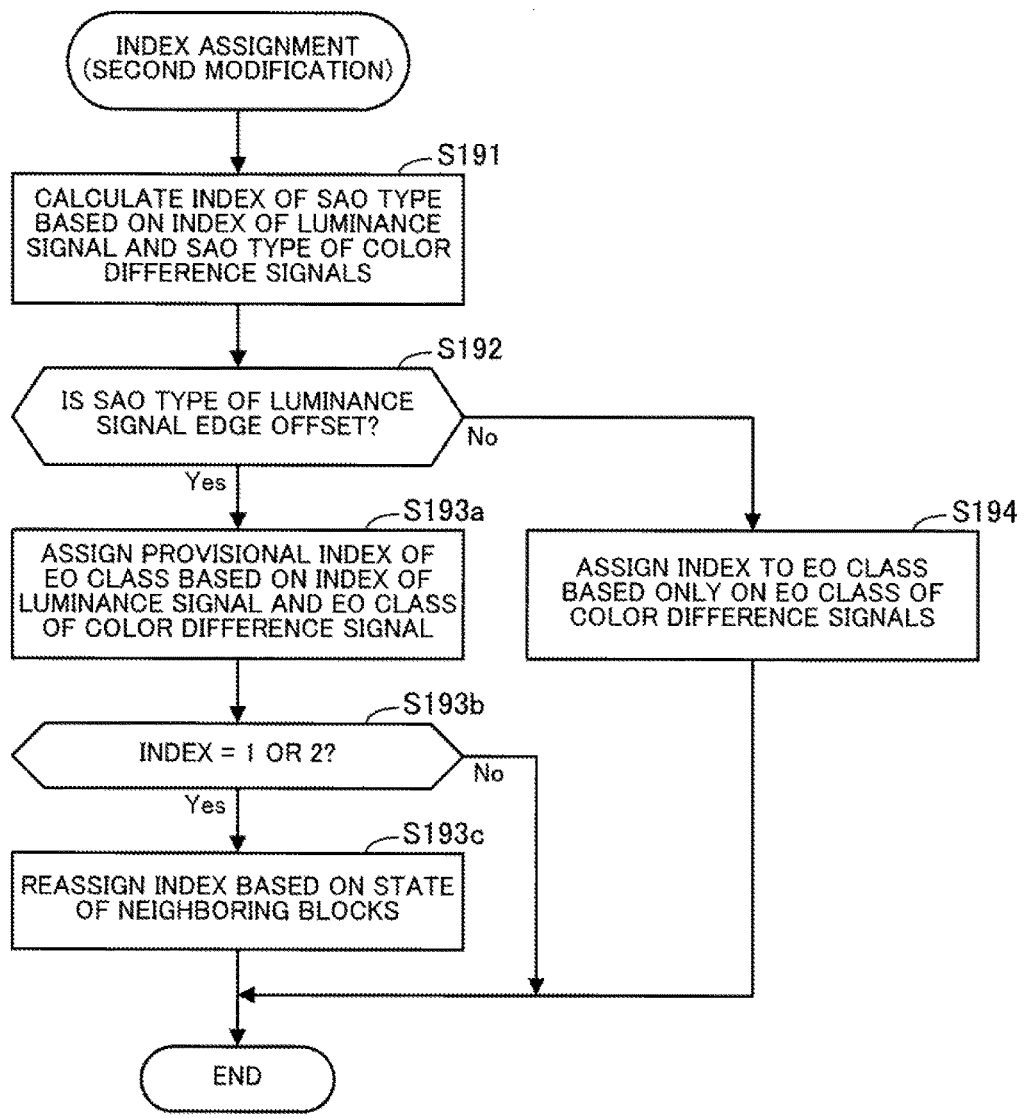
FIG. 18 is a flowchart illustrating an example of an index assigning procedure for the filtering modes of the color difference signals, performed by an image encoding device of a second modification.

FIG. 18 is a flowchart illustrating an example of an index assigning procedure for the filtering modes of the color difference signals, performed by the image encoding device of the second modification. According to the second modification, the procedure of FIG. 9 is partially modified as illustrated in FIG. 18. Specifically, steps S193a to S193c are performed in place of step S193.

[Step S193a] By the same procedure in step S193, the index generation unit 123 assigns a provisional index to sao_eo_class_chroma, which indicates an edge offset class of the color difference signals. The assignment of the index here is provisional.

[Step S193b] The index generation unit 123 determines whether the provisionally assigned index is "1" or "2". If the index is "1" or "2", the index generation unit 123 moves to step S193c. On the other hand, if the index is "0" or "3", step S193c is skipped and the index provisionally assigned in step S193a is applied with no change.

[Step S193c] According to the procedure of one of the first to third processing examples illustrated in FIG. 17, the index generation unit 123 reassigns an index of "1" or "2" to sao_eo_class_chroma indicating an edge offset class of the color difference signals based on the state of already encoded neighboring blocks of the encoding target block.

Figure 19:
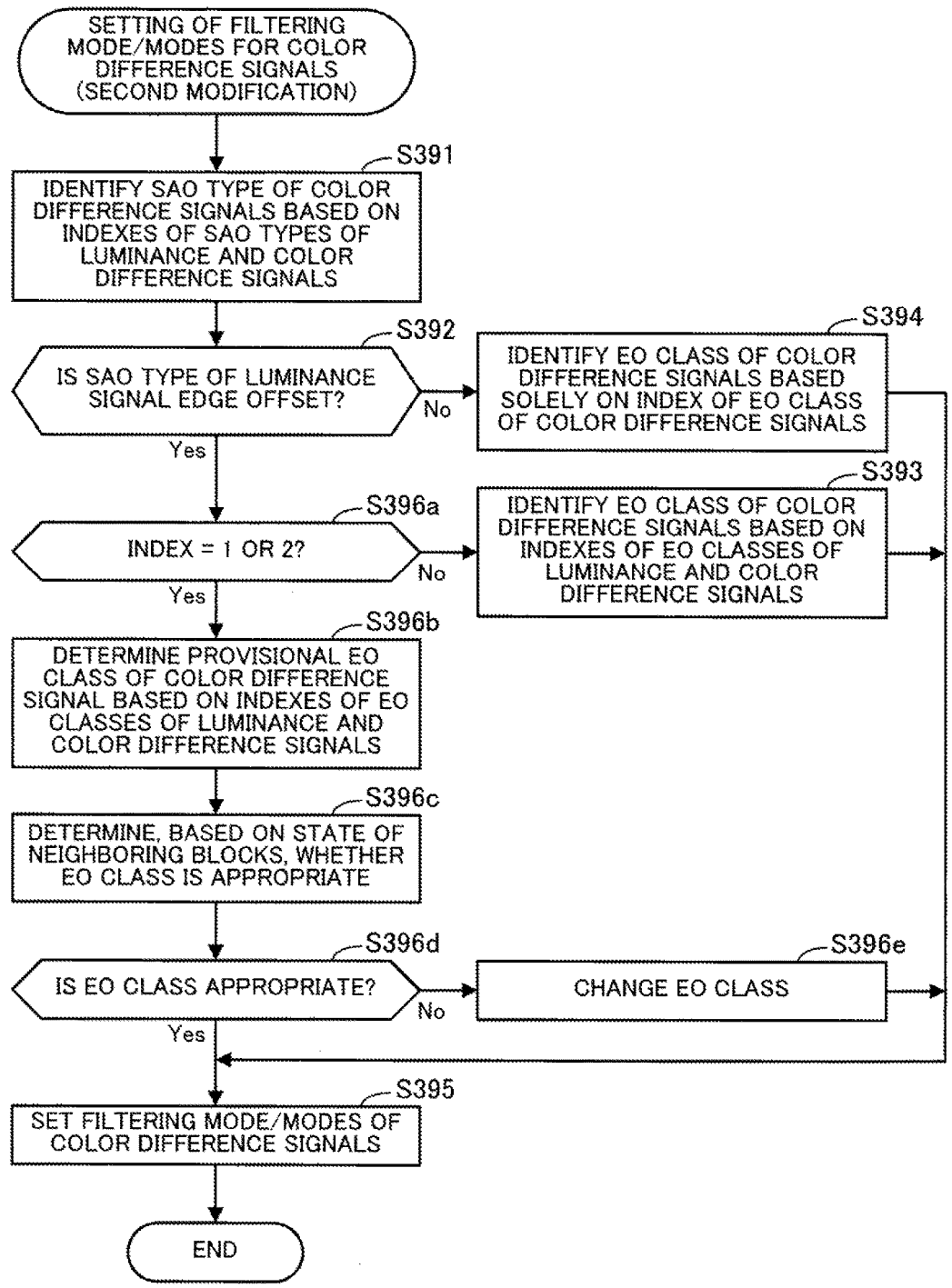
FIG. 19 is a flowchart illustrating an example of a filtering mode setting procedure for the color difference signals, performed by an image decoding device according to the second modification.

FIG. 19 is a flowchart illustrating an example of a filtering mode setting procedure for the color difference signals, performed by the image decoding device according to the second modification. In the second modification, steps S396a to S396e are added to the procedure illustrated in FIG. 12. When the SAO type of the color difference signals is identified to be edge offset in step S392 of FIG. 12, the filtering mode setting unit 213 moves to step S396a.

[Step S396a] The filtering mode setting unit 213 determines whether the index of sao_eo_class_chroma acquired in step S37 of FIG. 11 is "1" or "2" or not. If the index is "1" or "2", the filtering mode setting unit 213 moves to step S396b. If the index is "0" or "3", the filtering mode setting unit 213 moves to step S393.

[Step S396b] The filtering mode setting unit 213 provisionally determines an edge offset class for the color difference signals by the same procedure of step S393.

[Step S396c] Based on the state of already decoded neighboring blocks of the decoding target block, the filtering mode setting unit 213 determines whether the edge offset class provisionally determined in step S396b is appropriate. In this step, the filtering mode setting unit 213 identifies an index to be assigned to the provisionally determined edge offset class by the procedure of one of the first to third processing examples of FIG. 17. When the identified index matches the index of sao_eo_class_chroma acquired in step S37 of FIG. 11, the filtering mode setting unit 213 determines that the provisionally determined edge offset class is appropriate.

[Step S396d] When having determined in step S396c that the provisionally determined edge offset class is appropriate, the filtering mode setting unit 213 regards the edge offset class as a duly confirmed one and then moves to step S395. On the other hand, when having determined in step S396c that the provisionally determined edge offset class is not appropriate, the filtering mode setting unit 213 moves to step S396e.

[Step S396e] The filtering mode setting unit 213 changes the provisionally determined edge offset class. In this step, when the index of sao_eo_class_chroma acquired in step S37 of FIG. 11 is "1", the provisionally determined edge offset class is changed to an edge offset class determined by executing step S396b with the index of sao_eo_class_chroma being "2". On the other hand, when the index of sao_eo_class_chroma acquired in step S37 of FIG. 11 is "2", the provisionally determined edge offset class is changed to an edge offset class determined by executing step S396b with the index of sao_eo_class_chroma being "1".

(e) Third Embodiment

Figure 20:
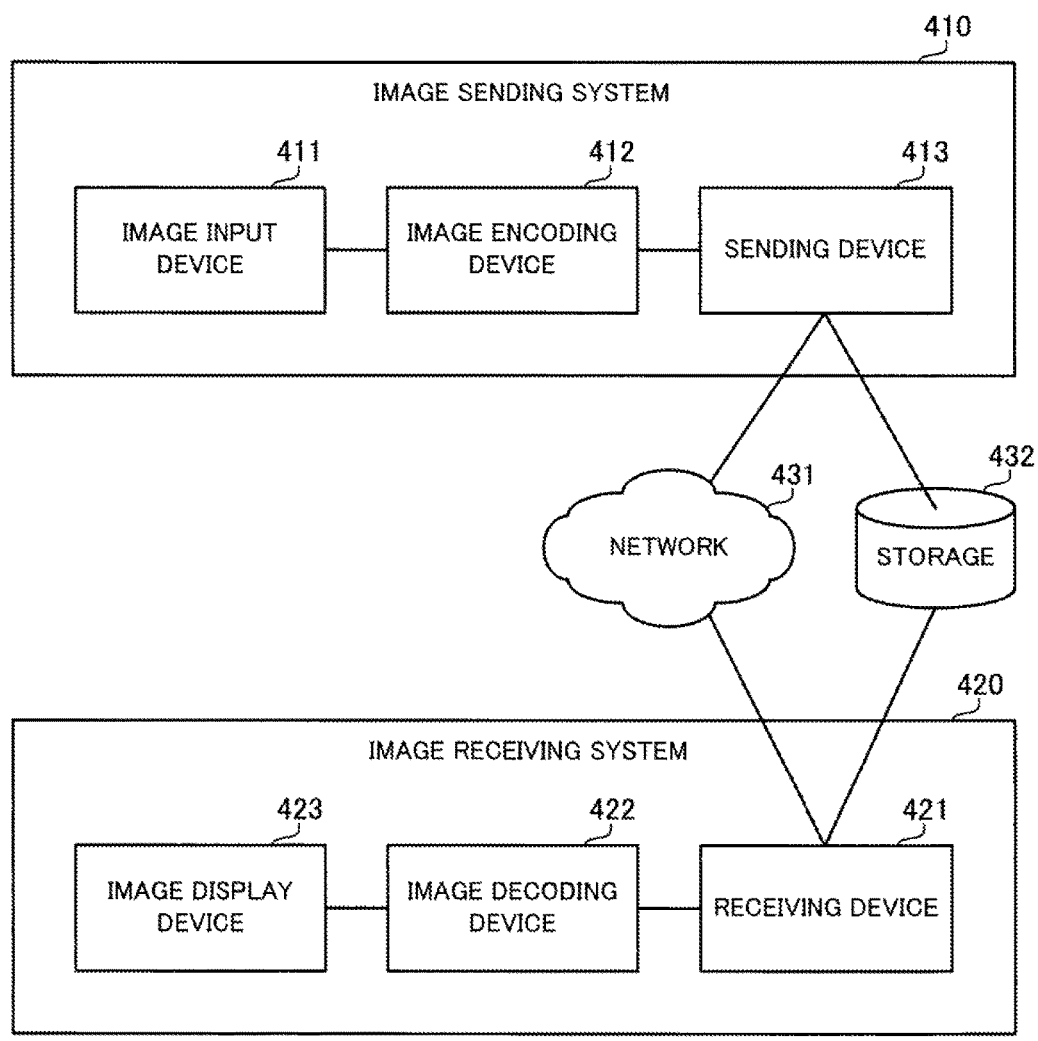
FIG. 20 illustrates a configuration example of an image transmission system according to a third embodiment.

The image encoding device 100 and the image decoding device 200 according to the second embodiment, the first modification, or the second modification above are implemented, for example, by incorporating them in an image transmission system illustrated in FIG. 20. FIG. 20 illustrates a configuration example of an image transmission system according to a third embodiment. The image transmission system includes an image sending system 410 for generating and sending video streams and an image receiving system 420 for receiving and decoding the video streams.

The image sending system 410 includes, for example, an image input device 411, an image encoding device 412, and a sending device 413. The image input device 411 supplies video baseband data to the image encoding device 412. The image input device 411 may be, for example, a camera for taking and outputting an image or a device for outputting, to the image encoding device 412, image data prestored in a storage medium or received on the air or through a wire. The image encoding device 412 compresses and encodes the video baseband data supplied by the image input device 411 to thereby generate a video stream. The functions of the image encoding device 100 of the second embodiment, the first modification, or the second modification are implemented on the image encoding device 412. The sending device 413 sends the video stream received from the image encoding device 412 to the image receiving system 420. The sending device 413 sends the video stream, for example, using a predetermined video transmission format or stack file format. In addition, the video stream may be sent, for example, via a network 431 or on the air. Alternatively, the video stream may be once stored in storage 432 and then transferred from the storage 432 to the image receiving system 420.

The image receiving system 420 includes, for example, a receiving device 421, an image decoding device 422, and an image display device 423. The receiving device 421 receives the video stream sent from the sending device 413, for example, via the network 431 or the storage 432, and then outputs the video stream to the image decoding device 422. The receiving device 421 extracts the video stream from the data sent from the sending device 413 using, for example, the above-mentioned video transmission format or stack file format, and then outputs the video stream to the image decoding device 422. The image decoding device 422 expands and decodes the video stream output from the receiving device 421 to thereby convert the video stream into video baseband data, and then outputs the video baseband data to the image display device 423. The functions of the image decoding device 200 of the second embodiment, the first modification, or the second modification are implemented on the image decoding device 422. The image display device 423 displays video based on the video baseband data output from the image decoding device 422.

Note that the processing functions of each of the devices described in the embodiments above (for example, the image encoding devices 10 and 100 and the image decoding device 200) may be achieved by a computer. In this case, a program is provided which describes processing details of the functions to be implemented by each of the devices. By executing the program on the computer, the above-described processing functions are achieved on the computer. The program in which the processing details are described may be recorded on computer-readable storage media. Such computer-readable storage media include a magnetic storage device, an optical disk, a magneto-optical storage medium, and semiconductor memory. Examples of the magnetic storage device are a HDD (hard disk drive), a FD (flexible disk), and a magnetic tape. Examples of the optical disk are a DVD (digital versatile disc), a DVD-RAM, a CD-ROM (compact disc-read only memory), a CD-R (CD-recordable), and a CD-RW (CD-rewritable). An example of the magneto-optical storage medium is a MO (magneto-optical disk).

In the case of distributing the program, for example, portable recording media, such as DVDs and CD-ROMs, in which the program is recorded are sold. In addition, the program may be stored in a storage device of a server computer and then transferred from the server computer to another computer via a network. A computer for executing the program stores the program, which is originally recorded in a portable storage medium or transferred from the server computer, in its own storage device. Subsequently, the computer reads the program from the storage device and performs processing according to the program. Note that the computer is able to read the program directly from the portable storage medium and perform processing according to the program. In addition, the computer is able to sequentially perform processing according to a received program each time such a program is transferred from the server computer connected via a network.

According to one aspect, it is possible to reduce the amount of encoded data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An image encoding apparatus comprising:
 a processor configured to perform a procedure including:
  determining a first operating mode and a second operating mode of an adaptive filter that is applied to a block in an input image in decoding, the determining including determining the first operating mode based on a first signal of the input image and determining the second operating mode based on a second signal of the input image, and encoding the second operating mode by assigning a code with a lower bit number to the second operating mode when the second operating mode has higher similarities to the first operating mode.

2. The image encoding apparatus according to claim 1, wherein:
the encoding includes assigning, to the second operating mode, the code with the lower bit number when the second operating mode is the same as the first operating mode than when the second operating mode is different from the first operating mode.

3. The image encoding apparatus according to claim 1, wherein:
the encoding includes:
encoding flag information indicating whether the second operating mode is the same as the first operating mode,
including the flag information in encoded data generated by encoding the input image, and
skipping, when the second operating mode is the same as the first operating mode, generation of the code assigned to the second operating mode and inclusion of the generated code in the encoded data.

4. The image encoding apparatus according to claim 1, wherein:
the encoding includes determining, when the second operating mode is different from the first operating mode, a bit number of the code to be assigned to the second operating mode for the block based on the second operating mode determined for each of already encoded neighboring blocks of the block.

5. The image encoding apparatus according to claim 1, wherein:
the encoding includes determining, when the second operating mode is different from the first operating mode, a bit number of the code to be assigned to the second operating mode based on pixel values of already encoded neighboring blocks of the block.

6. The image encoding apparatus according to claim 1, wherein:
the encoding includes a first process of assigning an index to the second operating mode and a second process of assigning, amongst a plurality of codes, the code with the lower bit number to the index when the index takes a lower value, and
in the first process, the lower value is assigned to the index when the second operating mode has higher similarities to the first operating mode.

7. An image encoding method comprising:
determining, by a computer, a first operating mode and a second operating mode of an adaptive filter that is applied to a block in an input image in decoding, the determining including determining the first operating mode based on a first signal of the input image and determining the second operating mode based on a second signal of the input image; and
encoding, by the computer, the second operating mode by assigning a code with a lower bit number to the second operating mode when the second operating mode has higher similarities to the first operating mode.

8. A non-transitory computer-readable storage medium storing an image encoding program that causes a computer to perform a procedure comprising:
determining a first operating mode and a second operating mode of an adaptive filter that is applied to a block in an input image in decoding, the determining including determining the first operating mode based on a first signal of the input image and determining the second operating mode based on a second signal of the input image; and
encoding the second operating mode by assigning a code with a lower bit number to the second operating mode when the second operating mode has higher similarities to the first operating mode.

9. An image decoding apparatus comprising:
a processor configured to perform a procedure including:
extracting, from encoded video data input thereto, a first code and a second code corresponding to a first operating mode and a second operating mode, respectively, of an adaptive filter,
identifying the first operating mode based on the first code,
identifying the second operating mode as an operating mode having higher similarities to the identified first operating mode when a bit number of the second code is lower,
performing a process using the adaptive filter on a first signal of a block in a decoded image reconstructed from the encoded video data according to the identified first operating mode, and
performing the process using the adaptive filter on a second signal of the block according to the identified second operating mode.

10. The image decoding apparatus according to claim 9, wherein:
the identifying the second operating mode includes identifying the second operating mode as being the same as the identified first operating mode when the second code matches, amongst a plurality of predetermined patterns of codes, a code with a lowest bit number.

11. The image decoding apparatus according to claim 9, wherein:
the procedure further includes identifying again the second operating mode of the block based on the second operating mode identified for each of already decoded neighboring blocks of the block when the identified second operation mode is different from the identified first operating mode and the identified second operating mode and the identified first operating mode form a specific combination.

12. The image decoding apparatus according to claim 9, wherein:
the procedure further includes identifying again the second operating mode of the block based on pixel values of already decoded neighboring blocks of the block when the identified second operation mode is different from the identified first operating mode and the identified second operating mode and the identified first operating mode form a specific combination.

13. An image decoding method comprising:
extracting, by a computer, from encoded video data input thereto, a first code and a second code corresponding to a first operating mode and a second operating mode, respectively, of an adaptive filter;
identifying, by the computer, the first operating mode based on the first code;
identifying, by the computer, the second operating mode as an operating mode having higher similarities to the identified first operating mode when a bit number of the second code is lower;
performing, by the computer, a process using the adaptive filter on a first signal of a block in a decoded image reconstructed from the encoded video data according to the identified first operating mode; and performing, by the computer, the process using the adaptive filter on a second signal of the block according to the identified second operating mode.

14. A non-transitory computer-readable storage medium storing an image decoding program that causes a computer to perform a procedure comprising:

extracting, from encoded video data input thereto, a first code and a second code corresponding to a first operating mode and a second operating mode, respectively, of an adaptive filter;

identifying the first operating mode based on the first code;

identifying the second operating mode as an operating mode having higher similarities to the identified first operating mode when a bit number of the second code is lower;

performing a process using the adaptive filter on a first signal of a block in a decoded image reconstructed from the encoded video data according to the identified first operating mode; and performing the process using the adaptive filter on a second signal of the block according to the identified second operating mode.

15. An image transmission system comprising:

an image encoding apparatus configured to generate encoded video data; and an image decoding apparatus configured to decode the encoded video data, wherein the image encoding apparatus includes a first processor configured to perform a procedure including:

determining a first operating mode and a second operating mode of an adaptive filter that is applied to a block in an input image in decoding, the determining including determining the first operating mode based on a first signal of the input image and determining the second operating mode based on a second signal of the input image, and encoding the second operating mode by assigning a code with a lower bit number to the second operating mode when the second operating mode has higher similarities to the first operating mode, and the image decoding apparatus includes a second processor configured to perform a procedure including:

extracting the first code and the second code from the encoded video data, identifying the first operating mode based on the first code, identifying the second operating mode as an operating mode having higher similarities to the identified first operating mode when a bit number of the second code is lower, performing a process using the adaptive filter on a first signal of the block decoded from the encoded video data according to the identified first operating mode, and performing the process using the adaptive filter on a second signal of the block according to the identified second operating mode.

* * * * *